(12) United States Patent
Tajima et al.

(10) Patent No.: US 7,929,032 B2
(45) Date of Patent: *Apr. 19, 2011

(54) METHOD AND APPARATUS FOR CORRECTING A DEFECTIVE PIXEL

(75) Inventors: Kaori Tajima, Machida (JP); Kosuke Nobuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 12/433,783

(22) Filed: Apr. 30, 2009

(65) Prior Publication Data

US 2009/0303357 A1 Dec. 10, 2009

Related U.S. Application Data

(63) Continuation of application No. 11/086,057, filed on Mar. 22, 2005, now Pat. No. 7,542,082.

(30) Foreign Application Priority Data

Mar. 30, 2004 (JP) .................................. 2004-099726
Apr. 30, 2004 (JP) .................................. 2004-135579

(51) Int. Cl.
*H04N 9/64* (2006.01)
*G06K 9/00* (2006.01)
*H04N 5/217* (2006.01)
(52) U.S. Cl. ........................ 348/246; 382/145; 348/241
(58) Field of Classification Search .................. 348/246, 348/273, 241, 247, 333.02
See application file for complete search history.

(56) References Cited

U.S. PATENT DOCUMENTS 6,642,960 B1 * 11/2003 Kohashi et al. ............... 348/246
2001/0010552 A1 * 8/2001 Nakajima ..................... 348/246

* cited by examiner

*Primary Examiner* — Jason Chan
*Assistant Examiner* — Joel Fosselman
(74) *Attorney, Agent, or Firm* — Canon U.S.A., Inc., IP Division

(57) ABSTRACT

An image processing apparatus and method for detecting and correcting a defective pixel in an image output from an image sensor including a plurality of pixels, comprising detection of an edge direction based on the image data, detection of a defective pixel included in the image sensor based on the detected edge direction, and correction of the selected defective pixel.

4 Claims, 23 Drawing Sheets

| $G_{11}$ |  | $G_{13}$ |  | $G_{15}$ |
|---|---|---|---|---|
|  | $G_{22}$ |  | $G_{24}$ |  |
| $G_{31}$ |  | $G_{33}$ |  | $G_{35}$ |
|  | $G_{42}$ |  | $G_{44}$ |  |
| $G_{51}$ |  | $G_{53}$ |  | $G_{55}$ |

|  | $G_{12}$ |  | $G_{14}$ |  |
|---|---|---|---|---|
| $G_{21}$ |  | $G_{23}$ |  | $G_{25}$ |
|  | $G_{32}$ | x | $G_{34}$ |  |
| $G_{41}$ |  | $G_{43}$ |  | $G_{45}$ |
|  | $G_{52}$ |  | $G_{54}$ |  |

| $R_{11}$ | 12 | $R_{13}$ | 14 | $R_{15}$ |
|---|---|---|---|---|
| 21 | 22 | 23 | 24 | 25 |
| $R_{31}$ | 32 | $R_{33}$ | 34 | $R_{35}$ |
| 41 | 42 | 43 | 44 | 45 |
| $R_{51}$ | 52 | $R_{53}$ | 54 | $R_{55}$ |

PIXEL OF INTEREST ($R_{33}$)

| Wr | Gb | Wr | Gb | Wr |
|----|----|----|----|----|
| Wb | Gr | Wb | Gr | Wb |
| Wr | Gb | Wr | Gb | Wr |
| Wb | Gr | Wb | Gr | Wb |
| Wr | Gb | Wr | Gb | Wr |

ODD FIELD

| Wb | Gr | Wb | Gr | Wb |
|----|----|----|----|----|
| Wr | Gb | Wr | Gb | Wr |
| Wb | Gr | Wb | Gr | Wb |
| Wr | Gb | Wr | Gb | Wr |
| Wb | Gr | Wb | Gr | Wb |

EVEN FIELD

| $Y_{11}$ | $Y_{12}$ | $Y_{13}$ | $Y_{14}$ | $Y_{15}$ |
|---|---|---|---|---|
| $Y_{21}$ | $Y_{22}$ | $Y_{23}$ | $Y_{24}$ | $Y_{25}$ |
| $Y_{31}$ | $Y_{32}$ | $Y_{33}$ | $Y_{34}$ | $Y_{35}$ |
| $Y_{41}$ | $Y_{42}$ | $Y_{43}$ | $Y_{44}$ | $Y_{45}$ |
| $Y_{51}$ | $Y_{52}$ | $Y_{53}$ | $Y_{54}$ | $Y_{55}$ |

FIG. 17

| $P_{11}$ | x | $P_{13}$ | x | $P_{15}$ |
|---|---|---|---|---|
| x | x | x | x | x |
| $P_{31}$ | x | $P_{33}$ | x | $P_{35}$ |
| x | x | x | x | x |
| $P_{51}$ | x | $P_{53}$ | x | $P_{55}$ |

METHOD AND APPARATUS FOR CORRECTING A DEFECTIVE PIXEL

CROSS-REFERENCE TO RELATED APPLICATIONS

This application is a continuation of U.S. patent application Ser. No. 11/086,057, filed Mar. 22, 2005, which claims priority to Japanese Patent Application No. 2004-135579 filed Apr. 30, 2004 and Japanese Patent Application No. 2004-099726 filed Mar. 30, 2004, the contents of all of which are hereby incorporated by reference.

BACKGROUND OF THE INVENTION

1. Field of the Invention

The present invention relates to a technique of correcting a defective pixel of an image sensor.

2. Description of the Related Art

In image sensors such as CCDs, pixels are produced in the form of a two-dimensional array by using semiconductor technology. Some pixels do not have sufficiently high sensitivity due to a failure or degradation that can occur during or after the process of producing image sensors. Such defective pixels do not output a correct signal corresponding to the intensity of incident light, and thus a white or black dot, which is not included in a subject, appears in an image.

It is known to detect defective pixels included in an image sensor and store information associated with defective pixels in a nonvolatile memory during the process of producing the image sensor in a factory such that degradation in image quality due to defective pixels can be compensated for based on the defect information by signal processing.

A great increase in the number of pixels of an image sensor has been achieved in recent years. The upper limit in the number of pixels was several hundred thousands a few years ago, but now image sensors having a few million pixels are available. However, the increase in the number of pixels causes an increase in probability that an image sensor has a defective pixel, despite advances in production techniques of image sensors. Low cost is required for images sensors for use in consumer products. To achieve a high production yield to meet the low-cost requirement, a large number of defective pixels must be accepted.

However, storing information indicating locations of a large number of defective pixels in an expensive nonvolatile memory results in an increase in total cost.

To avoid the above problem, Japanese Patent Laid-Open No. 06-030425 discloses a technique of correcting defective pixels such that the signal level of each pixel of an image captured by an image sensor is compared with signal levels of adjacent pixels with a similar color, and the pixel is regarded to be defective if the difference in signal level is greater than a predetermined threshold value. This technique allows defective pixels to be corrected without needing defective pixel position information stored in a nonvolatile memory. Japanese Patent Laid-Open No. 2002-027323 discloses a defective pixel correction technique that needs a less capacity of a nonvolatile memory. In this technique, information associated with only defective pixels located in a particular area of an image sensor is stored in a nonvolatile memory. After defective pixels are corrected based on the information stored in the nonvolatile memory, defective pixels located in the outside of the particular area are detected and corrected each time an image is captured by the image sensor. This technique makes it possible to handle a large number of defective pixels by using a limited capacity of the nonvolatile memory.

In the techniques described above, the correction is made without taking into account what kind of pattern the image has in the vicinity of each defective pixel. This can cause a problem that, for example, when edges of an image intersect each other in a local area including a plurality of defective pixels, a proper correction is not made and degradation in image quality occurs.

Japanese Patent Laid-Open No. 07-336602 discloses a defective pixel correction technique in which boundaries between pixels in the vicinity of a defective pixel are compared with each other, and a method of interpolation for determining a corrected pixel value is properly selected depending on a boundary pattern, thereby correcting the defective pixel without causing degradation in image quality.

However, in the technique disclosed in Japanese Patent Laid-Open No. 06-030425, when the signal level of each pixel of an image captured by an image sensor is compared with signals levels of adjacent pixels with a similar color and a determination on whether the pixel is defective is made by determining whether the difference in signal level is greater than a predetermined threshold value, a high-frequency component such as an edge of a subject can be incorrectly detected as a defective pixel. A correction made based on the incorrect detection of a defective pixel causes degradation in image quality, which is a problem with this technique. In the technique disclosed in Japanese Patent Laid-Open No. 2002-027323, defective pixels located in the particular area are detected and corrected each time an image is captured by an image sensor, without taking account the possibility that a high-frequency component such as an edge of a subject is incorrectly regarded as a defective pixel.

In the technique disclosed in Japanese Patent Laid-Open No. 07-336602, patterns of boundaries of defective pixels are identified based on the premise that locations of defective pixels are known. To meet the above premise, it is required to store in advance information indicating locations of all defective pixels, the number of which will increase with the total number of pixels, in a nonvolatile memory.

Thus, there is a need for a technique of effectively correcting defective pixels without causing degradation in image quality.

SUMMARY OF THE INVENTION

The present invention provides a method and apparatus for detecting and correcting a defective pixel, while properly taking into account effects of edge direction.

More specifically, the present invention provides an image processing apparatus comprising an edge direction detector for detecting an edge direction, based on image data captured from an image sensor including a plurality of pixels, a defective pixel detector for detecting a defective pixel included in the image sensor, based on the edge direction detected by the edge direction detector, and a corrector for correcting the defective pixel detected by the defective pixel detector.

According to the present invention, an edge direction is detected in a highly reliable fashion, and, based on the detected edge direction, defective pixels in the image sensor are correctly detected, and a high-precision correction is made.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a diagram showing a distribution of pixels with the same color as that of a pixel of interest, in the vicinity of the pixel of interest of a single-plate image sensor with a complementary color array.

DESCRIPTION OF THE EMBODIMENTS

Embodiments of the present invention will be described in detail in accordance with the accompanying drawings. However, the dimensions and materials, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
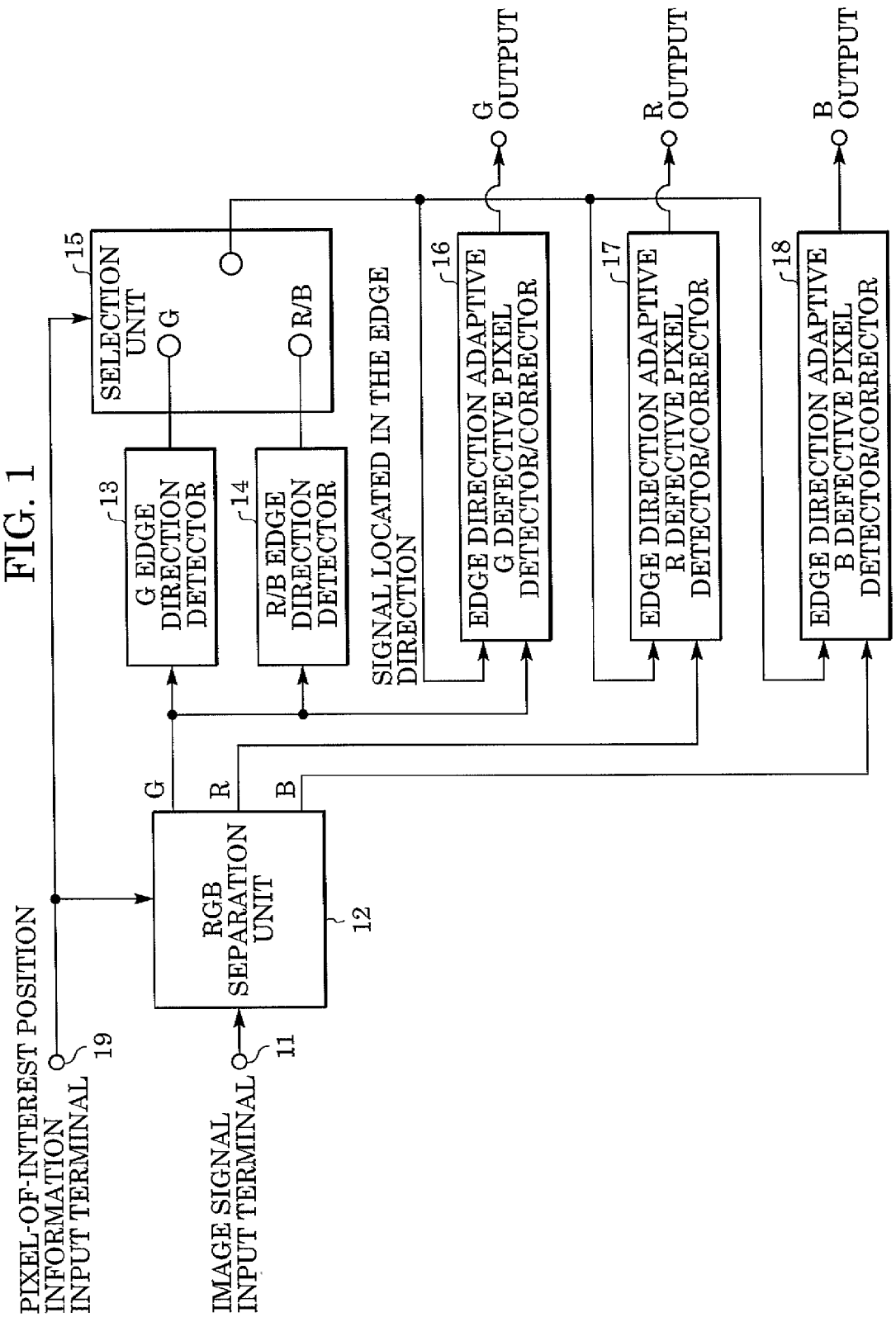
FIG. 1 is a schematic block diagram of a first embodiment of the present invention.

FIG. 1 is a schematic block diagram showing an image processing apparatus capable of correcting a defective pixel according to a first embodiment of the present invention. In this first embodiment, the present invention is applied to a single-plate image sensor with a primary-color Bayer array.

In FIG. 1, reference numeral 11 denotes an image signal input terminal for receiving an image signal output from an image sensor (not shown). Reference numeral 12 is an RGB separation unit that separates image signal input into color components corresponding to respective color filters.

Reference numeral 13 denotes a G edge direction detector for generating a signal located in the edge direction for use in detection and correction of a defective pixel of pixels at locations at which a G (green) filter is disposed. Reference numeral 14 denotes an R/B edge direction detector for generating a signal located in the edge direction for use in detection and correction of a defective pixel of pixels at locations at which an R (red) or B (blue) filter is disposed.

Reference numeral 15 denotes a selection unit for selecting the G or R/B signal located in the edge direction, the selection depending on the color of a color filter disposed at a pixel of interest to be subjected to the defective pixel detection/correction.

Reference numerals 16, 17, and 18 denote defective pixel detection adapted for edge direction/correction units controlled by the signal located in the edge direction output from the selection unit 15. The defective pixel detection adapted for edge direction/correction unit 16 performs detection and correction on a G image output from the RGB separation unit 12, and outputs the resultant defect-corrected G image signal.

The defective pixel detection adapted for edge direction/correction unit 17 performs detection and correction on an R image output from the RGB separation unit 12, and outputs the resultant defect-corrected R image signal. The defective pixel detection adapted for edge direction/correction unit 18 performs detection and correction on a B image output from the RGB separation unit 12, and outputs the resultant defect-corrected B image signal.

Position information indicating the position, on an image, of a pixel of interest to be subjected to defective pixel detection/correction is input via a pixel-of-interest position information input terminal 19. In accordance with the input position information, the color of the color filter located on the pixel of interest is uniquely determined, and the output of the RGB separation unit for selecting a signal located in the edge direction 12 and the output of the signal located in the edge direction selection unit 15 are switched in accordance with the determined color.

Figures 2, 3:
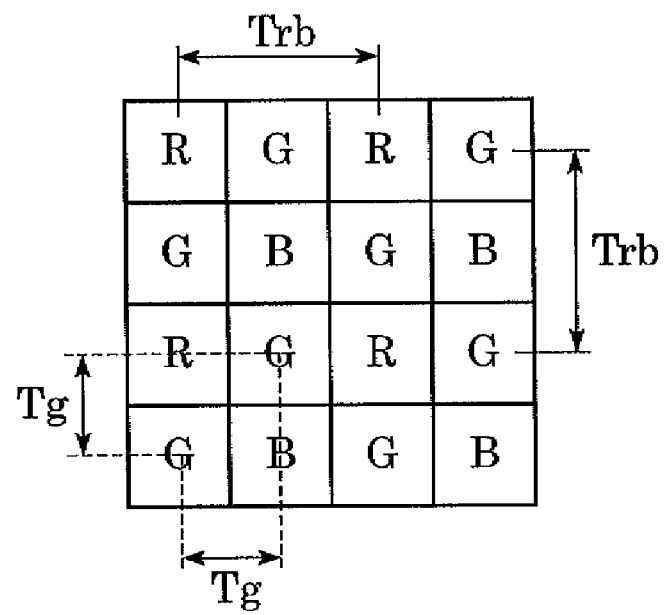
FIG. 2 is a diagram showing color filters arranged in the form of a primary-color Bayer array in an image sensor.
FIG. 3 is a diagram showing a distribution pattern of G pixels that appears in an edge direction detection area when a pixel of interest is a pixel on which a G filter is disposed.

The image signal input via the image input terminal 11 from the primary-color Bayer array image sensor in which color filters are arranged, as shown in FIG. 2, includes a sequence of alternately appearing lines of pixel values, one of which includes a series of pixels in the pattern of RGRG, and the other line includes a series of pixels in the pattern of GBGB. Before performing the defective pixel detection/correction process for each color, the RGB separation unit 12 separates the image signal into signals corresponding to respective colors.

For example, when the RGB separation unit 12 for selecting a signal located in the edge direction outputs a G image signal, the value for any pixel on which an R filter or a B filter is disposed is set to be 0, and only values of pixels on which a G filter is disposed are output. Similarly, when an R image signal or a B image signal is output, the value for any pixel on which a filter with a color different from the color of the image signal to be output is disposed is set to be 0.

The R, G, and B image signals output from RGB separation unit 12 are input to the defective pixel detection adapted for edge direction/correction units 16 to 18, respectively, for defective pixel correction. Of image signals output from the primary-color Bayer array image sensor, the G image signal is a signal suitable for use in edge direction detection, and thus the G image signal is input not only to the defective pixel detection adapted for edge direction/correction unit 17 for defection pixel correction, but also to the G edge direction detector 13 and the R/B edge direction detector 14. Based on the input G image signal, the G edge direction detector 13 and the R/B edge direction detector 14 produce signal located in the edge directions for controlling the defective pixel detection and correction, for respective R, G, and B colors.

The reason why the G signal in the primary-color Bayer array is suitable for use in the edge direction detection is described below.

At an edge of an image, an abrupt change in luminance level occurs in a very short range including only a few pixels. To detect such an abrupt change in luminance level, pixels of the image signal used for detection must be arranged so as to be capable of detecting high-frequency components corresponding to the abrupt change in luminance level.

In this regard, in the primary-color Bayer array, as shown in FIG. 2, color filters of G, which is high in visual sensitivity, are arranged in the form of a checkered pattern in which the pixel-to-pixel distance Tg of G pixels is one-half the pixel-to-pixel distance Trb of R and B pixels in both the horizontal and vertical directions. Thus, the G signal is most suitable for detection of high-frequency components of an image.

When a luminance signal for each pixel position is generated, after defective pixel correction is performed, the weighted average value of R, G, and B pixel values with predetermined particular weights is determined. In the calculation of the weighted average value, a greatest weight is assigned to the G signal, because the luminance is dominated by the G signal.

As described above, in the sampling structure of the primary-color Bayer array, G pixels are disposed at locations that allow high-frequency components of an image to be detected, and the G signal has a greater contribution to luminance than the other two colors. Thus, the G signal is suitable for detection of an edge and an edge direction.

In image signals, a change in luminance in a local area occurs in a continuous fashion, and an edge direction does not change greatly although color filters are changed from one pixel to another. Therefore, the signal located in the edge direction generated based on the G signal can be used for controlling the defective pixel detection and correction at pixels on which R or B filters are disposed.

Now, the edge direction detection process is described.

In the case of the image sensor with the primary-color Bayer array, locations of G pixels adjacent to a pixel of interest subjected to the defective pixel detection/correction vary depending on the color of the color filter disposed on the pixel of interest, and thus, a different calculation process is needed to detect the edge direction, depending on the color of the pixel of interest.

First, the process of detecting an edge direction at a pixel of interest on which a G filter is disposed is explained.

FIG. 3 is a diagram showing a distribution pattern of G pixels that appears when the pixel of interest is a pixel on which a G filter is disposed.

In FIG. 3, G33 denotes the pixel of interest to be subjected to the defective pixel detection/correction. In order to determine the direction of an edge at the position of the pixel of interest G33, the correlation of the pixel of interest with neighboring pixels in an edge direction area shown in FIG. 3 is detected in each of the following directions: a vertical direction, a horizontal direction, a 45° diagonal direction, and a 135° diagonal direction. For example, the correlation value Vdiff_G in the vertical direction is calculated using pixel values of pixels G13, G33, and G53 in accordance with equation (1).

$$V\text{diff}\_G=|G13+G53-2*G33| \quad (1)$$

Similarly, the correlation value Hdiff_G in the horizontal direction is calculated using pixel values of pixels G31, G33, and G35 in accordance with equation (2).

$$H\text{diff}\_G=|G31+G35-2*G33| \quad (2)$$

The correlation value D1diff_G in the 45° diagonal direction is calculated using pixel values of pixels G15, G24, G33, G42, and G51 in accordance with equation (3).

$$D1\text{diff}\_G=|G15+G51-2*G33|+|G24-G42| \quad (3)$$

The correlation value D2diff_G in the 135° diagonal direction is calculated using pixel values of pixels G11, G22, G33, G44, and G55 in accordance with equation (4).

$$D2\text{diff}\_G=|G11+G55-2*G33|+|G22-G44| \quad (4)$$

The direction of the edge at the pixel of interest can be estimated from the ratio between Vdiff_G and Hdiff_G. More specifically, the signal located in the edge direction Eg indicating the angle of the edge direction in the first quadrant can be calculated as follows.

i) When $V\text{diff}\_G>H\text{diff}\_G$, $Eg=1-H\text{diff}\_G/V\text{diff}\_G$ (5)

ii) When $H\text{diff}\_G>V\text{diff}\_G$, $Eg=-(1-V\text{diff}\_G/H\text{diff}\_G)$ (6)

Figure 4A:
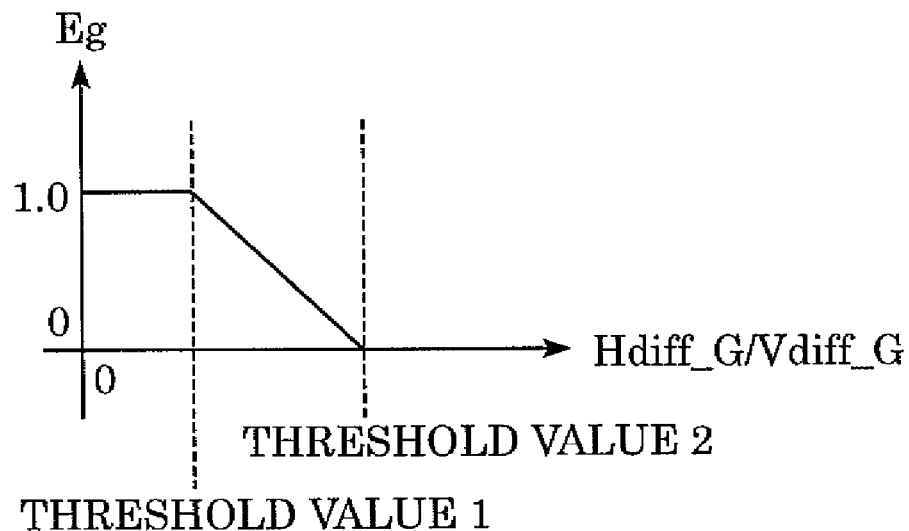
FIG. 4 is a diagram showing a controlling threshold process on a signal located in the edge direction.
Figure 4B:
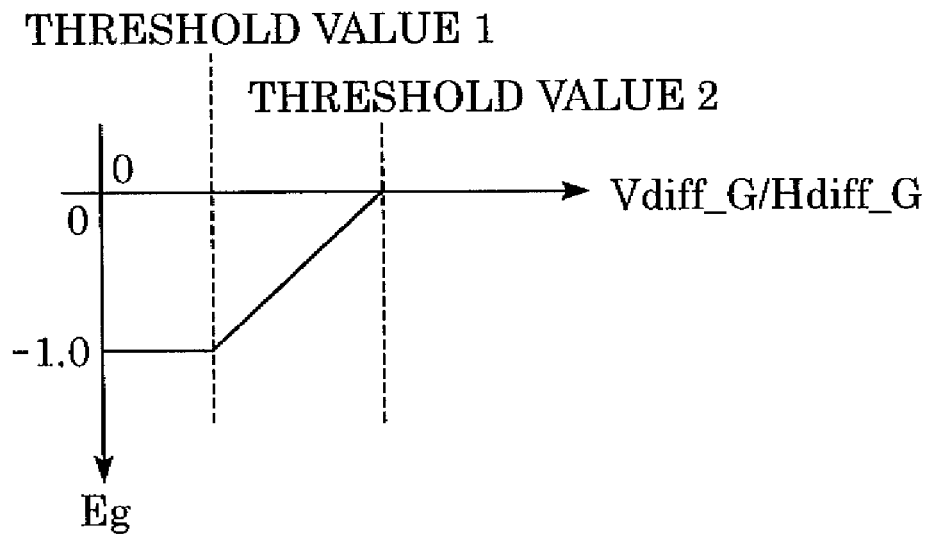

As shown in FIG. 4, the edge direction can be detected by controlling threshold values of the signal located in the edge direction Eg, as follows.

When Eg=1, the edge direction is exactly horizontal (0°).

When 1>Eg>0, the edge direction is within a range from 0° to 45°.

When −1<Eg<0, the edge direction is within a range from 45° to 90°.

When Eg=−1, the edge direction is exactly vertical (90°).

When Eg=0, the edge direction is 45°.

When the edge direction is expressed by an angle θ with respect to the horizontal direction, θ can take a value in the range from 0° to 180°, and thus it is needed to determine whether the angle is in the first or second quadrant. For this purpose, the correlation value D1diff_G in the 45° diagonal direction and the correlation value D2diff_G in the 135° diagonal direction are compared with each other. If D1diff_G is greater than the D2diff_G, it is determined that the angle is in the first quadrant, and the quadrant flag fg is set to 1. On the other hand, if D2diff_G is greater than the D1diff_G, it is determined that the angle is in the second quadrant, and fg is set to 2. When D1diff_G=D2diff_G, fg is set to 0. When Eg=0 and the difference between D1diff_G and D2diff_G is smaller than a predetermined value, the signal located the in edge direction Eg is reset to a value (Eg=2) indicating that there is no correlation.

Via the above procedure, the signal located in the edge direction Eg at the pixel of interest on which a G filter is disposed and the quadrant flag fg are produced. These parameters Eg and fg have relationships with the angle θ indicating the edge direction as shown in FIG. 5.

Now, the process of generating a signal located in the edge direction at a pixel of interest on which an R filter or a B filter is disposed is explained.

Figures 5, 6, 7:
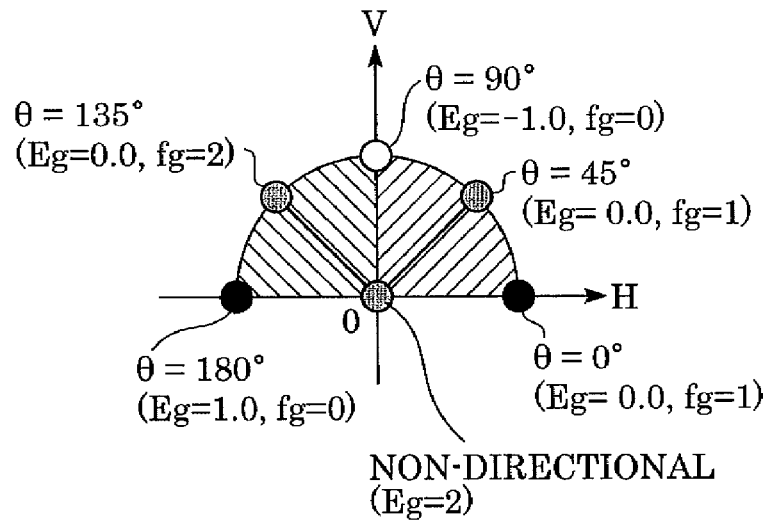
FIG. 5 is a diagram showing a relationship among a signal located in the edge direction, a quadrant identification flag, and an edge direction angle.
FIG. 6 is a diagram showing a distribution pattern of G pixels that appears in an edge direction detection area when a pixel of interest is a pixel on which an R filter or a B filter is disposed.
FIG. 7 is a diagram showing a distribution pattern of R pixels that appears in the vicinity of a pixel of interest when the pixel of interest is a pixel on which an R filter is disposed.

FIG. 6 is a diagram showing a distribution pattern of G pixels that appears when the pixel of interest is a pixel on which an R filter is disposed.

In FIG. 6, the pixel of interest to be subjected to the defective pixel detection/correction process is located at a position denoted by a mark X at which there is no G pixel. In order to determine the edge direction at the position of the pixel of interest, the correlation value Vdiff_R of the pixel of interest in the vertical direction is calculated using pixel values of pixels G23 and G43 vertically adjacent to the pixel of interest, in accordance with equation (7).

$$Vdiff\_R = |G23 - G43| \quad (7)$$

Similarly, the correlation value Hdiff_R in the horizontal direction is calculated using pixel values of pixels G32 and G34 horizontally adjacent to the pixel of interest, in accordance with equation (8).

$$Hdiff\_R = |G32 - G34| \quad (8)$$

Figure 10:
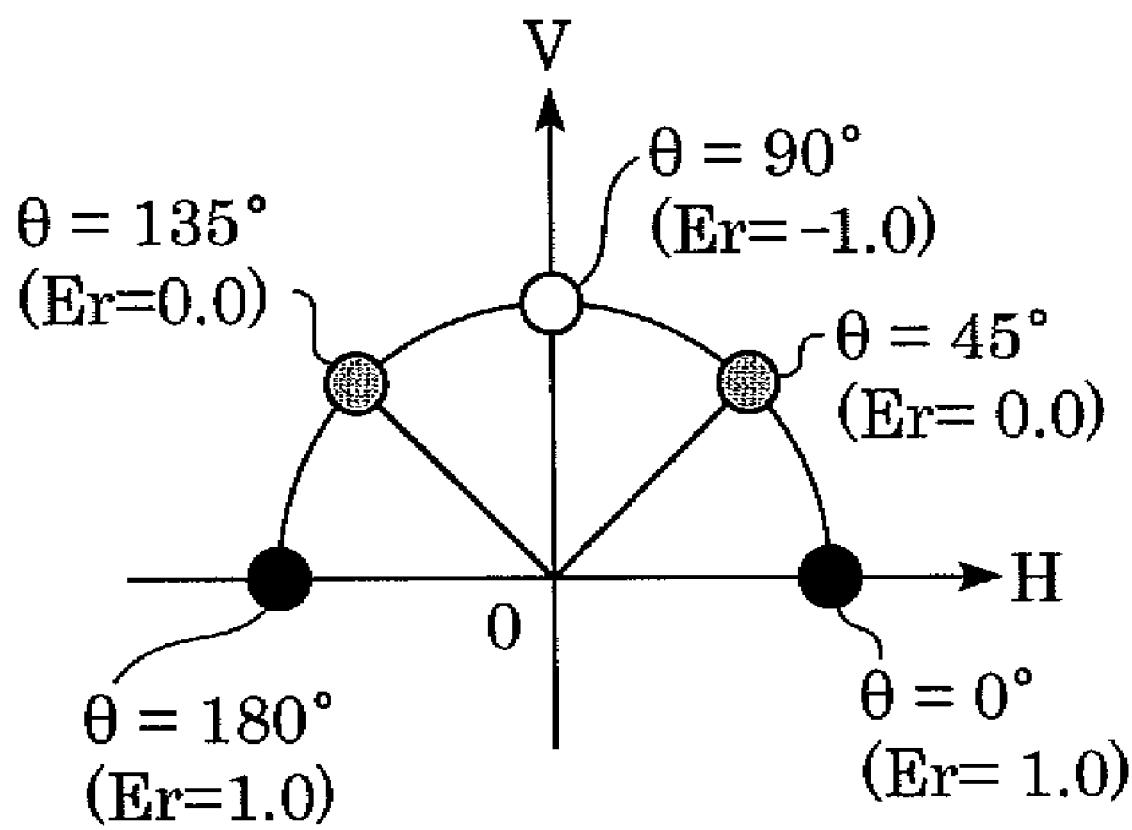
FIG. 10 is a diagram showing the relationship between a signal located in the edge direction and an edge direction angle at a pixel of interest on which an R or B filter is disposed.

As in the detection of the G signal located in the edge direction Eg, a signal located in the edge direction Er indicating the angle of the edge direction in the first quadrant is calculated from the ratio between Vdiffer_R and Hdiff_R thereby estimating the edge direction. The signal located in the edge direction Er has the relationship with the angle θ indicating the edge direction as shown in FIG. 10.

In the present embodiment, unlike the G edge direction detector, the R/B edge direction detector does not perform the quadrant determination based on the correlation values in the 45° and 135° diagonal directions. This is because in the sampling structure of the primary-color Bayer array, as shown in FIG. 7, the distance between two R or B adjacent pixels in a diagonal direction is large, and thus an erroneous quadrant determination can occur which causes a bad influence on the defective pixel detection/correction process.

When the pixel of interest is a pixel on which a B color filter is disposed, the distribution pattern of G pixels in the edge detection area is similar to that shown in FIG. 4, and thus the signal located in the edge direction Eb can be calculated in a similar manner to the case in which the pixel of interest is a pixel on which an R color filter is disposed.

The color of the color filter disposed on the pixel of interest is uniquely determined by the position of the pixel of interest in the image. Therefore, in the image processing method for correcting defective pixels according to the present embodiment, position information indicating the position of the pixel of interest input is input via the pixel-of-interest position information input terminal 19 shown in FIG. 1, and, in accordance with the input position information, the selection unit 15 selects the G edge direction detector 13 or the R/B edge direction detector 14 and outputs a signal located in the edge direction to control the defective pixel detection/correction unit.

Now, the defective pixel detection/correction unit is explained.

Because the signal level varies depending on the color of pixels, the defective pixel detection/correction process is performed for each color, based on pixel values of pixels adjacent to the pixel of interest and having the same color as that of the pixel of interest. Because of the difference in the sampling structure, the positions and the number of pixels that are used in the defective pixel detection/correction process are different depending on whether the color of the color filter disposed on the pixel of interest is G or the color is R or B.

Figure 8:
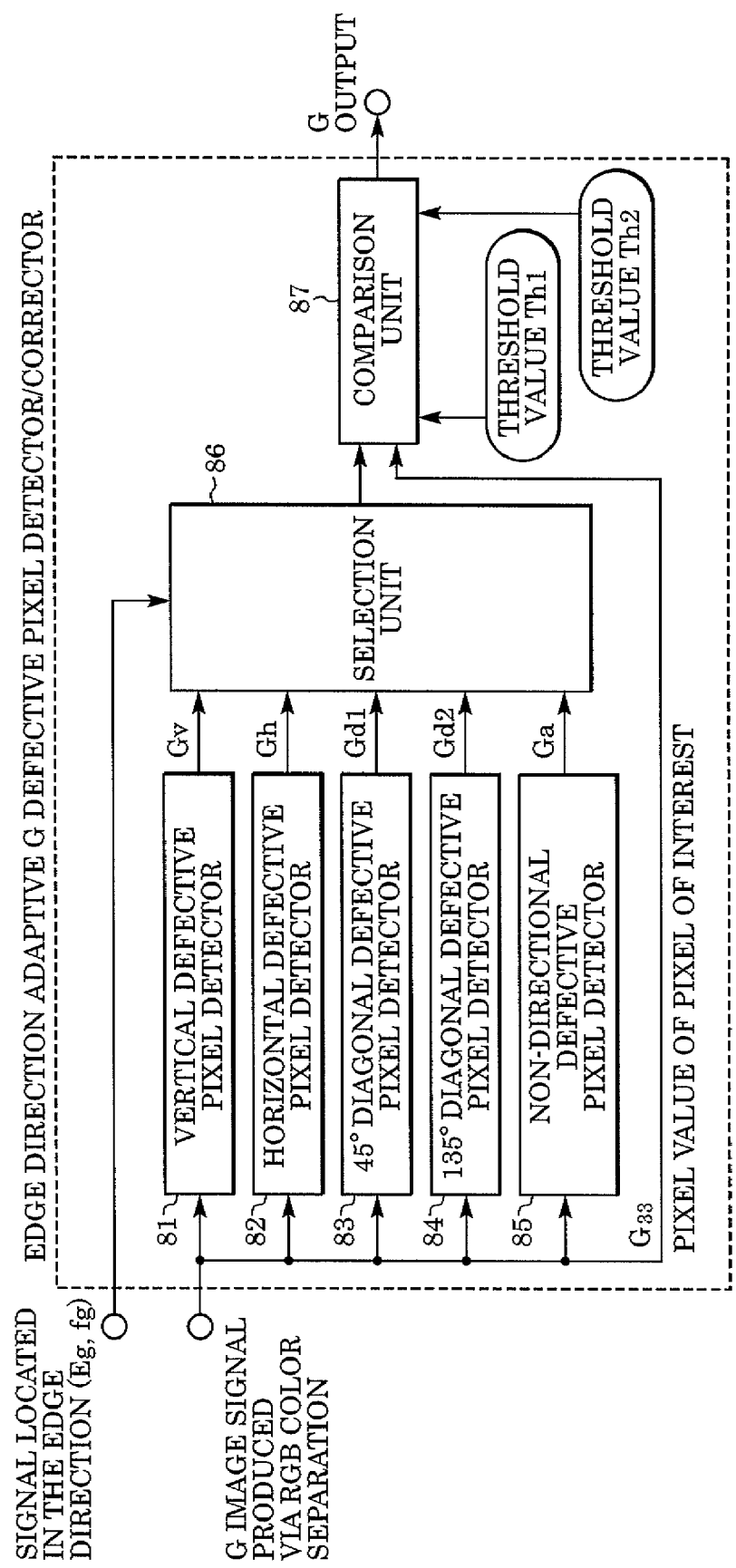
FIG. 8 is a block diagram showing a defective pixel detection adapted for an edge direction/correction unit for pixels on which a G color filter is disposed.

FIG. 8 shows an example of a construction of the defective pixel detection adapted for edge direction/correction unit for pixels on which a G color filter is disposed. Referring to FIGS. 8 and 3, the edge adaptive G defective pixel detection/correction process is described below.

In FIG. 8, reference numeral 81 denotes a vertical defective pixel detector, reference numeral 82 denotes a horizontal defective pixel detector, reference numeral 83 denotes a 45° diagonal defective pixel detector, 84 denotes a 135° diagonal defective pixel detector, and reference numeral 85 denotes a non-directional defective pixel detector. Reference numeral 86 denotes a selection unit, and reference numeral 87 denotes a comparison unit.

In the RGB color separation process, a G signal is generated by replacing all R and B pixel values with 0, and the resultant image signal having only G pixel values in a local area as shown in FIG. 3 is input via the G signal input terminal. Herein presume that a pixel G33 in FIG. 3 is currently selected as a pixel of interest to be subjected to the defective pixel detection/correction.

For the pixel G33 of interest, the vertical defective pixel detector 81 calculates the mean value Gv=(G13+G53)/2 of two pixels G13 and G53 vertically adjacent to the pixel G33 of interest.

The horizontal defective pixel detector 82 calculates the mean value Gh=(G31+G35)/2 of two pixels G31 and G35 vertically adjacent to the pixel G33 of interest.

The 45° diagonal defective pixel detector 83 calculates the mean value Gd1=(G24+G42)/2 of two pixels G24 and G42 located in a direction making an angle of 45° with the horizontal direction and adjacent to the pixel G33 of interest.

The 135° diagonal defective pixel detector 84 calculates the mean value Gd2=(G22+G44)/2 of two pixels G22 and G44 located in a direction making an angle of 135° with the horizontal direction and adjacent to the pixel G33 of interest.

The non-directional defective pixel detector 85 calculates the mean value Ga=(G13+G53+G31+G35+G22+G24+G42+G44)/8 of eight pixels G13, G53, G31, G35, G22, G24, G42, and G44 adjacent to the pixel G33 of interest in the vertical, horizontal, and diagonal directions.

Signals Eg and fg output from the G edge direction detector are input to the selection unit 86. The G signal located in the edge direction Eg has a decimal value in the range from −1 to +1 indicating a direction or has a value of 2 indicating that there is no correlation. On the other hand, fg has one of values 0, 1, and 2.

In accordance with the value of the input G edge signal Eg, the selection unit 86 selects one or two of signals output from defective pixel detectors 81 to 85. For example, when Eg=1, the edge direction is 0°, that is, the edge direction is exactly horizontal, and thus the output from the horizontal defective pixel detector 82 is selected.

When Eg=0.3 and fg=2, the edge direction is in the range from the vertical direction to the 135° diagonal direction, and thus two signals output from the vertical defective pixel detector 81 and the 135° diagonal defective pixel detector 84 are selected. When Eg=2, there is no correlation between the pixel of interest and neighboring pixels, that is, there is no particular edge direction, and thus the output from the non-directional defective pixel detector 85 is selected.

In the case in which multiple signals are output, two different types of defective pixel detectors are selected, weights assigned to the two signals are determined by the signal located in the edge direction Eg and the weighted mean value of two signals output from the defective pixel detectors is calculated. In the case in which one signal is output from a particular defective pixel detector is selected, the signal is directly output. For example, when Eg=0.3 and fg=2, the weighted mean value is calculated as follows:

$$Gdet=Gv*Eg+(1-Eg)*Gd2 \qquad (9)$$

The defective pixel detection signal Gdet output from the selection unit 86 and the pixel value of the pixel of interest G33 are input to the comparison unit 87. If the absolute value of the difference between these two values, that is, |Gdet−G33|, is greater than a first threshold value Th1, it is determined that the pixel of interest is a white defective pixel. If the absolute value is less than a second threshold value Th2, it is determined that the pixel of interest is a black defective pixel. In any case, the pixel value of the pixel G33 of interest, which is defective, is corrected by replacing it with Gdet.

On the other hand, when |Gdet−G33| is less than the first threshold value Th1 and greater than the second threshold value Th2, it is determined that the pixel of interest is not defective, and the value of G33 is directly output.

The defective pixel detection/correction process has been described above for the case in which the pixel of interest is a pixel on which a G color filter is disposed.

Figure 9:
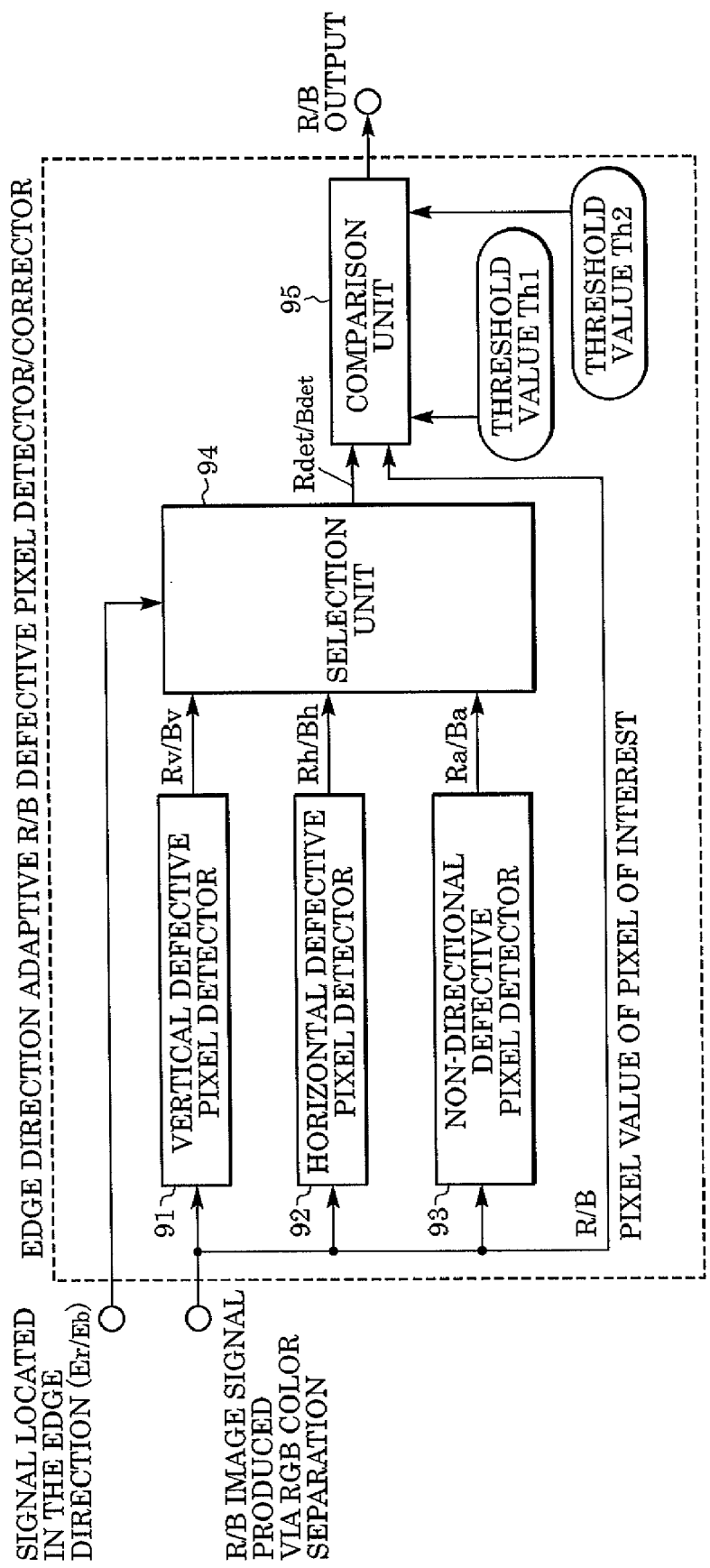
FIG. 9 is a block diagram showing a defective pixel detection adapted for an edge direction/correction unit for pixels on which an R color filter is disposed.

Now, referring to FIGS. 9 and 7, the defective pixel detection/correction process is described for the case in which the pixel of interest is a pixel on which an R color filter or a B color filter is disposed. In the following description, by way of example, the pixel of interest is an R pixel.

FIG. 9 shows an example of a construction of the defective pixel detection adapted for edge direction/correction unit for pixels on which an R color filter is disposed.

In FIG. 9, reference numeral 91 denotes a vertical defective pixel detector, reference numeral 92 denotes a horizontal defective pixel detector, and reference numeral 93 denotes a non-directional defective pixel detector. Reference numeral 94 denotes a selection unit, and reference numeral 95 denotes a comparison unit.

In the RGB color separation process, an R signal is generated by replacing all G and B pixel values with 0, and the resultant image signal having only R pixel values in a local area as shown in FIG. 7 is input via the R signal input terminal. Herein presume that a pixel R33 in FIG. 7 is currently selected as a pixel of interest to be subjected to the defective pixel detection/correction.

For the pixel R33 of interest, the vertical defective pixel detector 91 calculates the mean value Rv=(R13+R53)/2 of two pixels R13 and R53 vertically adjacent to the pixel R33 of interest.

The horizontal defective pixel detector 92 calculates the mean value Rh=(R31+R35)/2 of two pixels R31 and R35 vertically adjacent to the pixel R33 of interest.

The non-directional defective pixel detector 93 calculates the mean value Ra=(R11+R13+R15+R31+R35+R51+R53+R55)/8 of eight pixels R11, R13, R15, R31, R35, R51, R53, and R53 adjacent to the pixel R33 of interest in vertical, horizontal, and diagonal directions.

A signal Er output from the R edge direction detector is input to the selection unit 94. The R signal located in the edge direction Er has a decimal value in the range from −1 to +1. In accordance with the value of the input R edge signal Er, the selection unit 94 selects one or two of signals output from defective pixel detectors 91 to 93.

For example, when Er=1, the edge direction is 0°, that is, the edge direction is exactly horizontal, and thus the output from the horizontal defective pixel detector 92 is selected. When Er=−1, the edge direction is 90°, that is, the edge direction is exactly vertical, and thus the output from the vertical defective pixel detector 91 is selected.

In the present embodiment, when Er=0, the edge adaptive R or B defective pixel detection/correction unit does not care whether the edge direction is 45° or 135°.

This is because in the primary-color Bayer array, the distance between adjacent R or B pixels in a diagonal direction is large, and thus there is a low correlation among R or B pixels in such a direction. Therefore, when the edge direction is 45° or 135°, it is most reasonable to select the mean value of eight pixels located in various directions in the vicinity of the pixel of interest, output from the non-directional defective pixel detector 85.

When 1>Er>0 or −1<Er<0, two signals output from the vertical defective pixel detector 91 and the horizontal defective pixel detector 92 are selected. Weights assigned to the two signals are determined by the signal located in the edge direction Er and the weighted mean value of two signals output from the defective pixel detectors 91 and 92 is calculated.

The defective pixel detection signal Rdet output from the selection unit 94 and the pixel value of the pixel of interest R33 are input to the comparison unit 95. If the absolute value of the difference between these two values, that is, |Rdet−R33|, is greater than a first threshold value Th1, then the pixel of interest is a white defective pixel. If the absolute value is less than a second threshold value Th2, then the pixel of interest is a black defective pixel. In any case, the pixel value of the pixel R33 of interest, which is defective, is corrected by replacing it with Rdet.

On the other hand, when |Rdet−R33| is less than the first threshold value Th1 and greater than the second threshold value Th2, it is determined that the pixel of interest is not defective, and the value of R33 is directly output.

The defective pixel detection/correction process has been described above for the case in which the pixel of interest is a pixel on which an R color filter is disposed. When the pixel of interest is a B pixel, the defective pixel detection/correction process can be performed in a similar manner, and thus an explanation where the pixel of interest is a B pixel is omitted.

In the image processing apparatus according to the present embodiment, by performing the defective pixel detection/correction process in the above-described manner, the defective pixel detection/correction along an edge direction of a subject image can be performed adequately and reliably. The present embodiment of the invention allows the edge direction to be correctly detected without being influenced by the difference in spatial sampling structure among colors of color filters disposed on the image sensor because the edge direction is detected using only one color signal. The correct detection of the edge direction allows a defective pixel to be detected and corrected depending on the detected edge direction. Thus, in the present embodiment, even though high-frequency components of an image signal can be extracted only for a particular color signal because of the difference in sampling structure among colors of color filters, an edge can be correction detected by means of controlling threshold values without encountering problems caused by the difference among colors of color filters.

Second Embodiment

Figure 11:
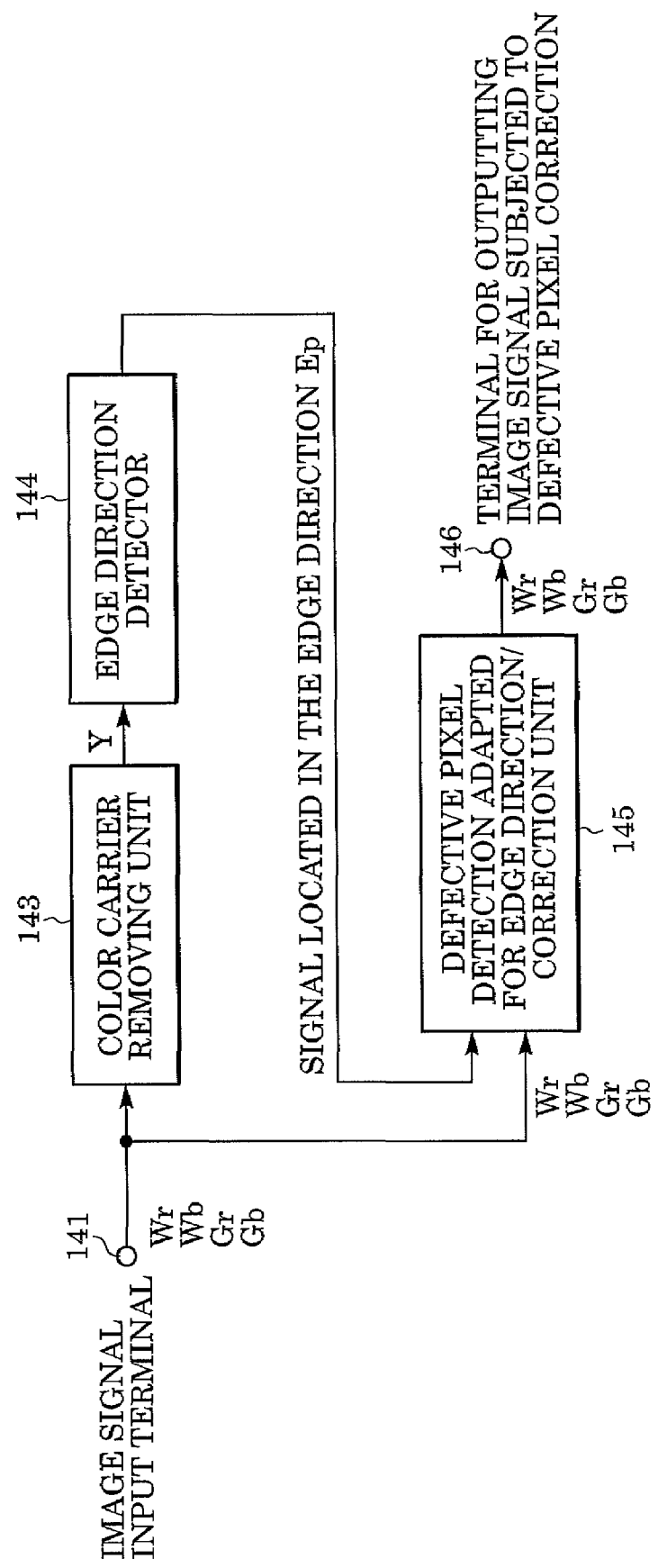
FIG. 11 is a schematic block diagram of an embodiment of the present invention.

FIG. 11 is a schematic block diagram showing an image processing apparatus capable of correcting a defective pixel according to a second embodiment of the present invention. In this second embodiment, the invention is applied to a single-plate field-integration image sensor with a complementary color array.

In FIG. 11, reference numeral 141 denotes an image signal input terminal. An image signal to be subjected to the defective pixel detection/correction process is output from an image sensor (not shown) and input via this image signal input terminal 141. Reference numeral 143 denotes a color carrier removing unit for removing a color carrier component superimposed on the input image signal for each pixel. Reference numeral 144 denotes an edge direction detector for detecting an edge direction at a pixel of interest, from a luminance component obtained by removing the color carrier from the image signal.

Reference numeral 145 denotes a defective pixel detection adapted for edge direction/correction unit that detects a defective pixel from the image signal that has not been subjected to the color carrier removal process, based on the signal located in the edge direction Ep calculated by the edge direction detector 144. A detected defective pixel is corrected, and a resultant image signal is output from an output terminal 146.

Figures 12, 13A, 13B:
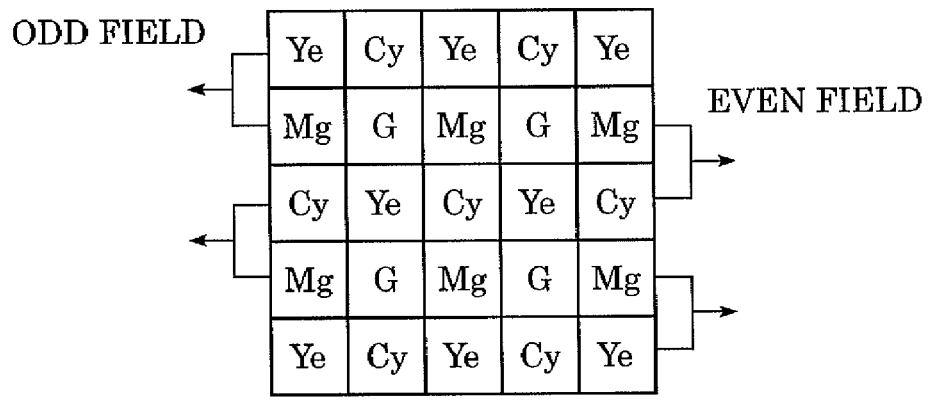
FIG. 12 is a diagram showing color filters arranged in the form of a complementary color array in a single-plate image sensor.
FIGS. 13A and 13B are diagrams showing distributions of color signals obtained by addition-reading a single-plate image sensor with a complementary color array.

In the specific example of the single-plate image sensor with the complementary color array used in the present embodiment, color filters of yellow (Ye), cyan (Cy), magenta (Mg), and green (G) are arranged as shown in FIG. 12.

As shown in FIG. 12, in the case of field integration, pixel values are read out as follows. In each odd field, the pixel value of a pixel in an odd-numbered line and the pixel value of an adjacent pixel in a following even-numbered line are added together, and the resultant sum is output. The adding and outputting is performed sequentially for all pixels. In each even field, the pixel value of a pixel in an even-numbered line and the pixel value of an adjacent pixel in a following odd-numbered line are added together, and the resultant sum is output. The adding and outputting is performed sequentially for all pixels.

If the sums of pixel values are expressed as Wb=Mg+Cy, Wr=Ye+Mg, Gb=Cy+G, and Gr=Ye+G, then in the output image signal, a sequence of Wr, Gb, Wr, Gb, ... and a sequence Wb, Gr, Wb, Gr, ... appear alternately in each odd field as shown in FIG. 13A. In each even field, as shown in FIG. 13B, a sequence of Wb, Gr, Wb, Gr, ... and a sequence Wr, Gb, Wr, Gb, ... appear alternately.

Herein, let So be a signal of a line in which Wr and Gb appear alternately as pixel values, and let Se be a signal of a line in which Wb and Gr appear alternately as pixel values. So and Se can then be expressed in the form of Fourier series as follows.

$$So = Wr + Gb + ((Wr - Gb) * \sin 2\pi fst)/2 \quad (10)$$
$$= (2R + 3G + 2B) + ((2R - G) * \sin 2\pi fst)/2$$

$$Se = Wb + Gr + ((Wb - Gr) * \sin 2\pi fst)/2 \quad (11)$$
$$= (2R + 3G + 2B) + ((2B - G) * \sin 2\pi fst)/2$$

where fs is the carrier frequency.

As can be seen from expressions (10) and (11), each line signal includes a base band luminance component Y=2R+3G+2B and a color carrier component Cr=((2R−G)*sin 2πfst)/2 or Cb=((2B−G)*sin 2πfst)/2 superimposed on the based band luminance component.

In the color carrier removing unit 143, the color carrier component included in each line signal is removed by passing it through an LPF with a particular band width. After the color carrier component is removed, the resultant signal includes only a luminance component, as shown in FIG. 14.

At an edge of an image, a great change in luminance occurs. Thus, in the present embodiment, an edge signal used to control the defective pixel detection/correction process, which will be described later, is produced from the image signal obtained by removing the color carrier from the original image signal.

Now, the edge direction detection process is described.

Figures 14, 15:
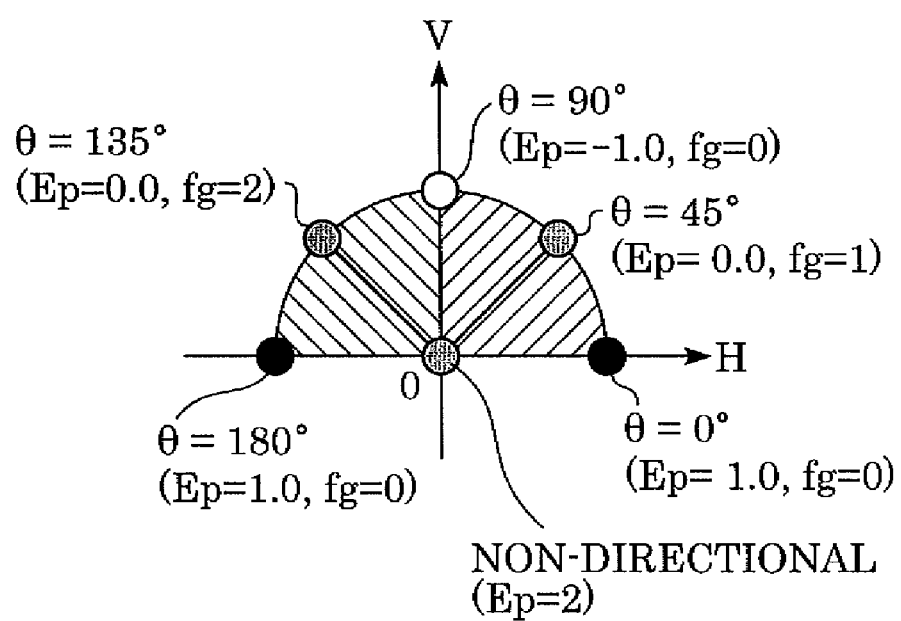
FIG. 14 is are diagrams showing a distribution of signals obtained by removing a color carrier from a color signals obtained by addition-reading a single-plate image sensor with a complementary color array.
FIG. 15 is a diagram showing the relationship between a signal located in the edge direction and an edge direction angle according to an embodiment of the invention.

FIG. 14 shows an edge direction detection area of an image signal obtained by removing a color carrier from an original image signal. Herein, presume that a pixel Y33 in FIG. 14 is currently selected as a pixel of interest being subjected to the defective pixel detection/correction process. In order to detect the edge direction at the position of the pixel of interest, first, the vertical component Vdiff_Y of the edge direction is calculated using pixel values of pixels Y13 Y23, Y33, Y43, and Y53 (including the pixel of interest itself) located in the vertical direction in the vicinity of the pixel of interest, in accordance with equation (12).

$$V\text{diff}\_Y = |Y13 + Y53 - 2*Y33| + |Y23 - Y43| \quad (12)$$

The horizontal component Hdiff_Y of the edge direction is then calculated using pixels values of pixels Y31, Y32, Y33, Y34, and Y35 (including the pixel of interest itself) located in the horizontal direction in the vicinity of the pixel of interest, in accordance with equation (13).

$$H\text{diff}\_Y = |Y31 + Y35 - 2*Y33| + |Y32 - Y34| \quad (13)$$

As in the edge direction detection process according to the first embodiment, the edge direction at the pixel of interest is estimated from the ratio between Vdiff_Y and Hdiff_Y, and a parameter Ep indicating the edge direction is output. If the angle made by the edge direction with the horizontal direction is denoted by θ, θ has a relationship with the signal located in the edge direction Ep indicating the edge direction as shown in FIG. 15.

The process of detecting and correcting defective pixels along the edge direction is described below. For any given image, pixels with the same color component are distributed around a pixel of interest as shown in FIG. 17. This distribution pattern is the same regardless of whether the color component of the pixel of interest is any one of Wb, Wr, Gb, and Gr.

In FIG. 17, P33 denotes a pixel of interest. Detection and correction of a defective pixel are performed using a total of 8 pixels including the pixel of interest and pixels P11, P13, P15, P31, P35, P51, P53, and P55 located in the vicinity of the pixel of interest. In FIG. 17, pixels marked with X have color components different from that of the pixel of interest.

Figure 16:
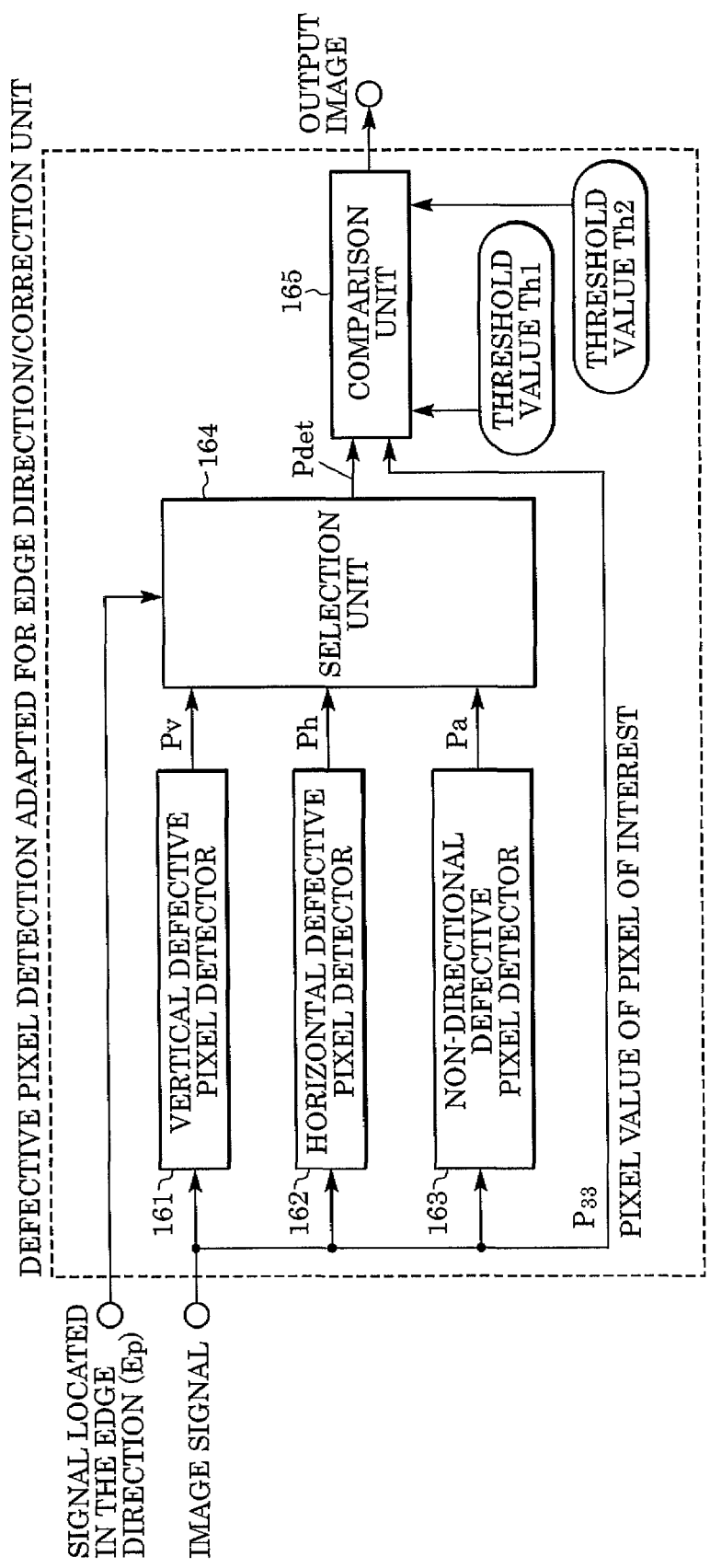
FIG. 16 is a block diagram showing a defective pixel detection adapted for an edge direction/correction unit according to an embodiment of the present invention.

FIG. 16 shows an example of a construction of a defective pixel detection adapted for edge direction/correction unit. In FIG. 16, reference numeral 161 denotes a vertical defective pixel detector, reference numeral 162 denotes a horizontal defective pixel detector, and reference numeral 163 denotes a non-directional defective pixel detector. Reference numeral 164 denotes a selection unit, and reference numeral 165 denotes a comparison unit.

For the pixel P33 of interest, the vertical defective pixel detector 161 calculates the mean value Pv=(P13+P53)/2 of two pixels P13 and P53 having the same color component and located vertically adjacent to the pixel P33 of interest shown in FIG. 17. The horizontal defective pixel detector 162 calculates the mean value Ph=(P31+P35)/2 of two pixels P31 and P35 having the same color component and located horizontally adjacent to the pixel P33 of interest. The non-directional defective pixel detector 163 calculates the mean value Pa=(P11+P13+P31+P35+P51+P53+P55)/8 of eight pixels P11, P13, P31, P35, P51, P53, and P55 located adjacent to the pixel P33 of interest in the vertical, horizontal, and diagonal directions.

The selection unit 164 selects one or two of signals output from the defective pixel detectors, in accordance with the signal located in the edge direction Ep output from the edge direction detector. The signal located in the edge direction Ep has a decimal value in the range from −1 to +1. For example, when Ep=1, the edge direction is 0°, that is, the edge direction is exactly horizontal, and thus the output from the horizontal defective pixel detector 162 is selected. When Ep=−1, the edge direction is 90°, that is, the edge direction is exactly vertical, and thus the output from the vertical defective pixel detector 161 is selected.

In the single-plate image sensor with the complementary color array, as shown in FIG. 17, a large distance between pixels with the same color located in a diagonal direction causes a low correlation of the pixel of interest with pixels that are referred to in the defective pixel detection/correction. Therefore, when the signal located in the edge direction Ep has a value (Ep=0) indicating a diagonal direction, the value indicating the mean value of eight adjacent pixels, output from the non-directional defective pixel detector 163, is selected.

When 1>Ep>0 or −1<Ep<0, two signals output from the vertical defective pixel detector 161 and the horizontal defective pixel detector 162 are selected. In this case, weights assigned to the two signals are determined by the signal located in the edge direction Ep and the weighted mean value of two signals output from the defective pixel detectors is calculated.

The defective pixel detection signal Pdet output from the selection unit 164 and the pixel value of the pixel of interest P33 are input to the comparison unit 165. If the absolute value of the difference between these two values, that is, |Pdet−P33|, is greater than a first threshold value Th1, then the pixel of interest is a white defective pixel. If the absolute value is less than a second threshold value Th2, then the pixel of interest is a black defective pixel. In any case, the pixel value of the pixel P33 of interest, which is defective, is corrected by replacing it with Pdet.

On the other hand, when |Pdet−P33| is less than the first threshold value Th1 and greater than the second threshold value Th2, it is determined that the pixel of interest is not defective, and the value of P33 is directly output.

In the present embodiment, as described above, a defective pixel included in a single-plate image sensor with a complementary color array is detected in a highly reliable fashion and corrected based on adjacent pixel values in a direction along an edge of a subject.

The present embodiment of the invention allows the edge direction to be correctly detected without being influenced by the difference in spatial sampling structure among colors of color filters disposed on the image sensor because the edge direction is detected using a signal (luminance signal) obtained by removing a color carrier. The correct detection of the edge direction allows a defective pixel to be detected and corrected adequately depending on the detected edge direction. Thus, in the present embodiment, even though high-frequency components of an image signal can be extracted only for a particular color signal because of the difference in sampling structure among colors of color filters, an edge can be correction detected by means of controlling threshold values without encountering problems caused by the difference among colors of color filters.

Third Embodiment

The aspects of the present invention may also be achieved by supplying a software program code implementing the functions of any of the embodiments described above to a computer connected to a plurality of devices or to a computer in a system whereby the computer (a CPU or an MPU) in the system or the apparatus controls various devices in accordance with the program code.

Furthermore, the program code may be stored in a memory provided on an expansion board inserted into the computer or an expansion unit connected to the computer, and a part or all of the process may be executed by a CPU or the like provided on the expansion board or the expansion unit thereby realizing the functions according to the invention. Storage media which can be employed, but not limited to, in the present invention to store the program code include a floppy disk, hard disk, optical disk, magneto-optical disk, CD-ROM, magnetic tape, non-volatile memory card, and ROM.

Furthermore, the scope of the present invention includes not only such a system in which the functions of any embodiment described above is implemented simply by executing a program code on a computer but also a system in which the functions of any embodiment described above is implemented by the program code in cooperation with an OS (operating system) on which the program runs or in cooperation with another application software.

Furthermore, the program code may be stored in a memory provided on an expansion board inserted into the computer or an expansion unit connected to the computer, and a part or all of the process may be executed by a CPU or the like provided on the expansion board or the expansion unit thereby realizing the functions according to the invention.

Figure 18:
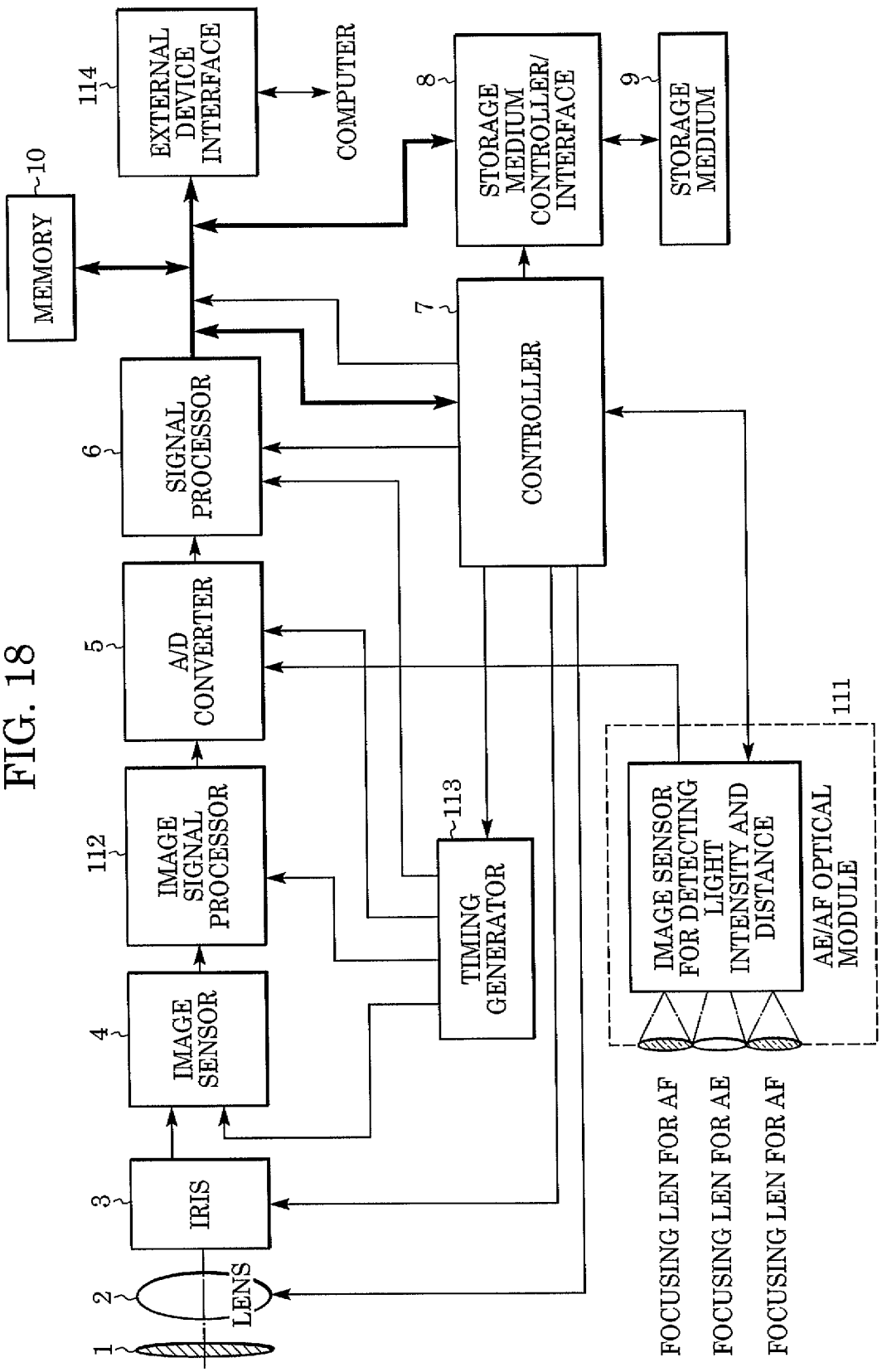
FIG. 18 is a block diagram showing an example of a system configuration of an imaging device according to an embodiment of the present invention.

Turning to FIG. 18, an imaging system using an image sensor according to one of the above-described embodiments will now be explained.

In FIG. 18, reference numeral 1 denotes a barrier that serves as a protector of a lens and also serves as a main switch. Reference numeral 2 denotes the lens for forming an optical image of a subject on an image sensor 4. Reference numeral 3 denotes an iris for controlling the amount of light which has passed through the lens 2. The image sensor 4 converts the optical image of the subject formed by the lens 2 into an electrical image signal. Reference numeral 112 denotes an image signal processor. The image signal undergoes predetermined signal processes, such as reset noise removal or the like, and sample and hold process by the image signal processor in accordance with the timing signal determined by the timing generator 113, then is outputted to the A/D converter 5. Reference numeral 5 denotes an A/D converter that converts the analog image signal output from the image sensor 4 into a digital signal. Reference numeral 6 denotes a signal processor that performs various signal processes, including correction and data compression, on the image data output from the A/D converter 5 (the process of the image processing apparatus according to the present embodiment is performed by this signal processor 6 under the control of a controller 7). Reference numeral 7 denotes the controller that performs various calculations and controls the operation over the whole still video camera. Reference numeral 10 denotes a memory for temporarily storing image data. Reference numeral 8 denotes an interface via which to write or read data in or from a storage medium. Reference numeral 9 denotes a removable storage medium, such as a semiconductor memory, for storing image data. Reference numeral 114 denotes an external device interface which to send or receive data in or from a external machinery.

The still video camera constructed in the above-described manner operates as follows.

When the barrier 1 is opened, main power is turned on. Subsequently, a power supply for a control system (not shown) is turned on, and furthermore a power supply (not shown) for the image sensing circuit including the A/D converter 5 and other parts is turned on. The controller 7 then fully opens the iris 3 to make it possible to control light exposure. The signal output from the image sensor 4 is converted to a digital signal by the A/D converter 5, and a resultant digital signal is captured by the signal processor 6. Based on data captured by the signal processor 6, the controller 7 determines the brightness and controls the iris 3 in accordance with the brightness to obtain correct light exposure.

The controller 7 also determines the distance to a subject by extracting a high-frequency component from the signal output from the image sensor 4. The controller 7 slightly changes the lens position to check whether the current lens position provides the best focus via the AE/AF Optical Module 111. If not, the controller 7 changes the lens position and again measures the distance to the subject.

After the lens position is adjusted to the best focus position, actual exposure is made. After the exposure is completed, an image signal is output from the image sensor 4 to the A/D converter 5 and converted to a digital signal. The resultant digital signal is stored in the memory 10 via the signal processor 6 under the control of the controller 7. Thereafter, the data stored in the memory 10 is transferred, under the control of the controller 7, to a removable storage medium such as a semiconductor memory via the storage medium controller/interface unit 8.

Fourth Embodiment

Figure 19:
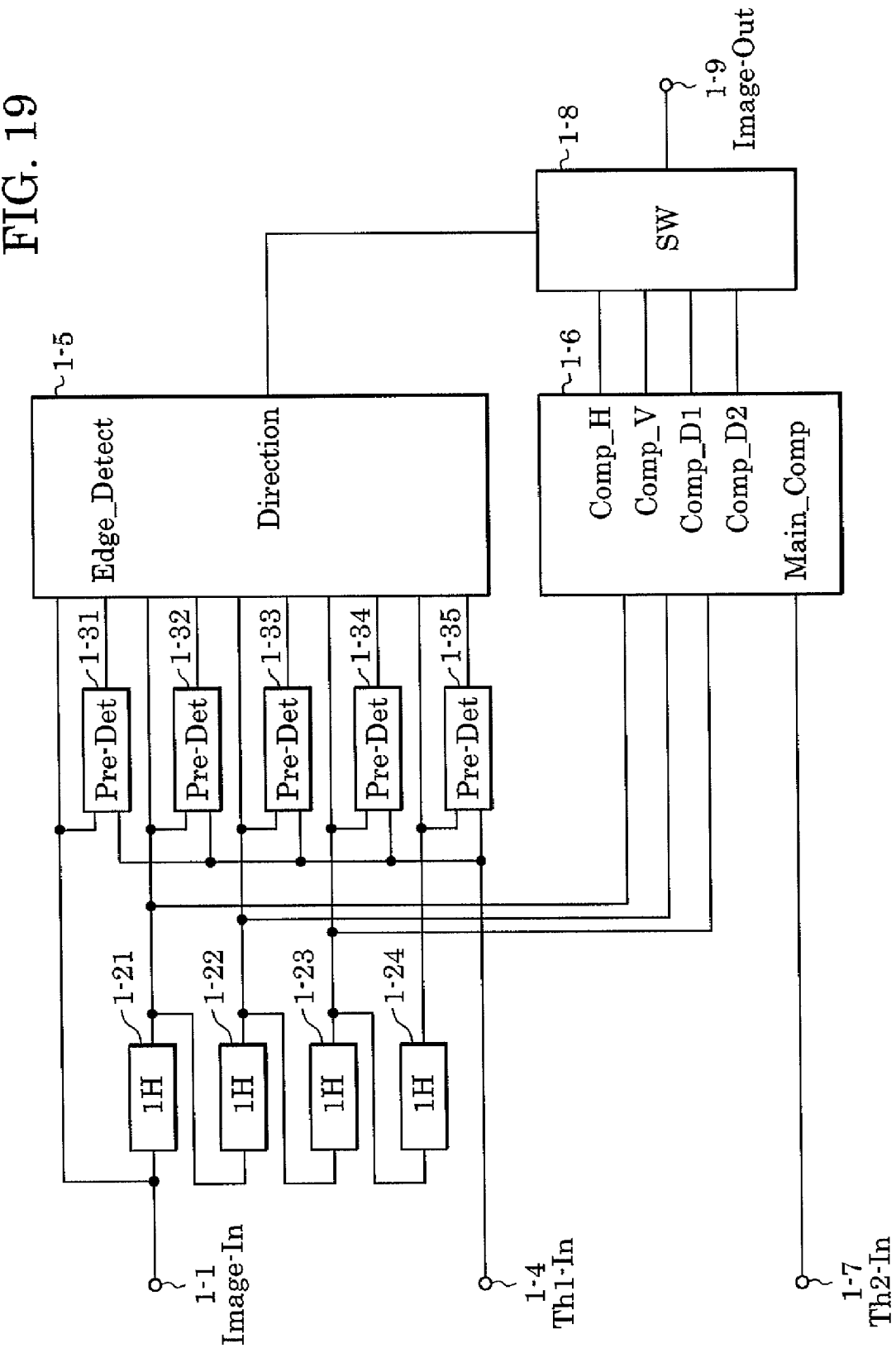
FIG. 19 is a schematic diagram of an embodiment of the present invention.

FIG. 19 shows an image processing apparatus according to a fourth embodiment of the present invention. In this embodiment, the invention is applied to a color imaging device including image sensors corresponding to respective color components such as three colors R, G, and B, to detect and correct a defective pixel based on one of the color components.

In FIG. 19, reference numeral 1-1 denotes an image signal input terminal for inputting an image signal output from the image sensor (not shown). Reference numeral 1-21 denotes a first line memory, reference numeral 1-22 denotes a second line memory, reference numeral 1-23 denotes a third line memory, and reference numeral 1-24 denotes a fourth line memory. Reference numeral 1-31 denotes a first preliminary defective pixel detector, reference numeral 1-32 denotes a second preliminary defective pixel detector, reference numeral 1-33 denotes a third preliminary defective pixel detector, reference numeral 1-34 denotes a fourth preliminary defective pixel detector, and reference numeral 1-35 denotes a fifth preliminary defective pixel detector. Reference numeral 1-4 denotes a first threshold value input terminal for inputting a first threshold value used for preliminary defective pixel detection. Reference numeral 1-5 denotes a luminous gradient direction detector for detecting a luminance gradient perpendicular to an edge direction of an image. Reference numeral 1-6 denotes a two-dimensional defective pixel detection/correction unit. Reference numeral 1-7 denotes a second threshold value input terminal for inputting a second threshold value used for two-dimensional defective pixel detection. Reference numeral 1-8 denotes a changeover switch. Reference numeral 1-9 denotes a terminal for outputting a corrected image signal.

Figure 20:
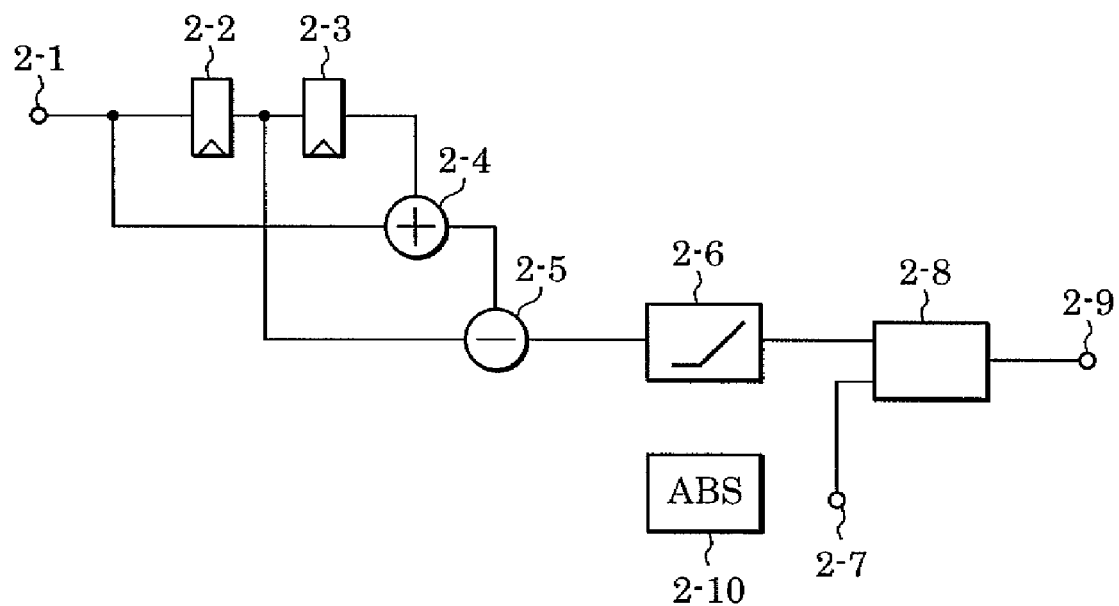
FIG. 20 is a diagram showing the details of a preliminary defective pixel detector shown in FIG. 19.

FIG. 20 shows the details of each of preliminary defective pixel detectors 1-31 to 1-35 shown in FIG. 19.

In FIG. 20, reference numeral 2-1 denotes an image signal input terminal connected to the image signal input terminal 1-1 or to the output of one of the line memories 1-21 to 1-24 shown in FIG. 19. Reference numeral 2-2 denotes a first flip-flop, and reference numeral 2-3 denotes a second flip-flop. Reference numeral 2-4 denotes an adder, and reference numeral 2-5 denotes a subtractor. Reference numeral 2-6 denotes a limiter. Reference numeral 2-7 denotes a threshold value input terminal connected to the first threshold value input terminal 1-4 shown in FIG. 19. Reference numeral 2-8 denotes a comparison unit. Reference numeral 2-9 denotes a terminal for outputting the result of the preliminary defective pixel detection. Reference numeral 2-10 denotes an absolute value calculation circuit which can be used instead of the limiter 2-6.

Figure 21:
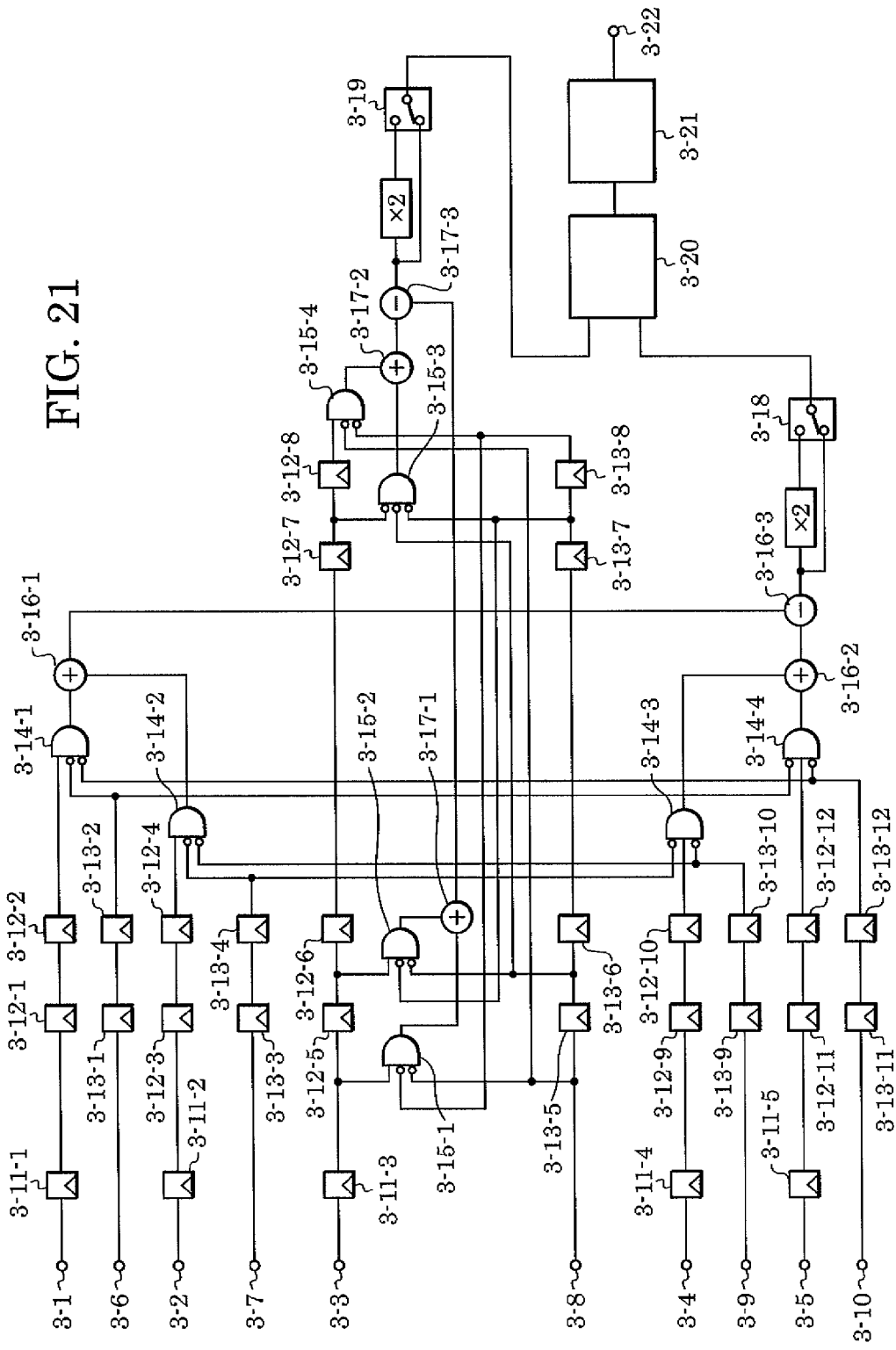
FIG. 21 is a diagram showing the details of a luminous gradient direction detector shown in FIG. 19.

FIG. 21 shows the details of the luminous gradient direction detector 1-5 shown in FIG. 19.

In FIG. 21, reference numeral 3-1 denotes a first image signal input terminal connected to the image signal input terminal 1-1 shown in FIG. 19. Reference numeral 3-2 denotes a second image signal input terminal connected to the output of the first line memory 1-21 shown in FIG. 19. Reference numeral 3-3 denotes a third image signal input terminal connected to the output of the second line memory 1-22 shown in FIG. 19. Reference numeral 3-4 denotes a fourth image signal input terminal connected to the output of the third line memory 1-23 shown in FIG. 19. Reference numeral 3-5 denotes a fifth image signal input terminal connected to the output of the fourth line memory 1-24 shown in FIG. 19. Reference numeral 3-6 denotes a first preliminary detection flag input terminal connected to the output of the first preliminary defective pixel detector 1-31 shown in FIG. 19. Reference numeral 3-7 denotes a second preliminary detection flag input terminal connected to the output of the second preliminary defective pixel detector 1-32 shown in FIG. 19. Reference numeral 3-8 denotes a third preliminary detection flag input terminal connected to the output of the third preliminary defective pixel detector 1-33 shown in FIG. 19. Reference numeral 3-9 denotes a fourth preliminary detection flag input terminal connected to the output of the fourth preliminary defective pixel detector 1-34 shown in FIG. 19. Reference numeral 3-10 denotes a fifth preliminary detection flag input terminal connected to the output of the fifth preliminary defective pixel detector 1-35 shown in FIG. 19.

Reference numerals 3-11-1 to 3-11-5 denote flip-flops for adjusting phases between signals input to the image signal input terminals 3-1 to 3-5 and signals input to corresponding preliminary detection flags 3-6 to 3-10. Reference numerals 3-12-1 to 3-12-12 denote flip-flops for holding pixel values of a total of eight pixels vertically and horizontally adjacent to the pixel of interest being subjected to the luminance gradient direction detection process, wherein two of the horizontally adjacent pixels are located to the left of the pixel of interest, two of the horizontally adjacent pixels are located to the right of the pixel of interest, two of the vertically adjacent pixels are located above the pixel of interest, and two of the vertically adjacent pixels are located below the pixel of interest. Reference numerals 3-13-1 to 3-13-12 denote flip-flops for holding preliminary detection flags associated with a total of eight pixels vertically and horizontally adjacent to the pixel of interest being subjected to the luminance gradient direction detection process, wherein two of the horizontally adjacent pixels are located to the left of the pixel of interest, two of the horizontally adjacent pixels are located to the right of the pixel of interest, two of the vertically adjacent pixels are located above the pixel of interest, and two of the vertically adjacent pixels are located below the pixel of interest.

Reference numerals 3-14-1 to 3-14-4 denote AND devices for performing a logical calculation of preliminary flag values associated with a total of four pixels vertically adjacent to the pixel of interest being subjected to the luminance gradient direction detection process, wherein two of the vertically adjacent pixels are located above the pixel of interest, and two of the vertically adjacent pixels are located below the pixel of interest. Reference numerals 3-15-1 to 3-15-4 denote AND devices for performing a logical calculation of preliminary flag values associated with a total of four pixels horizontally adjacent to the pixel of interest being subjected to the luminance gradient direction detection process, wherein two of the horizontally adjacent pixels are located to the left of the pixel of interest, and two of the horizontally adjacent pixels are located to the right of the pixel of interest, reference numerals 3-16-1 to 3-16-3 denote logical operation devices for calculating the vertical differential of pixel values in the vicinity of the pixel of interest being subjected to the luminance gradient direction detection process. Reference numerals 3-17-1 to 3-17-3 denote logical operation devices for calculating the horizontal differential of pixel values in the vicinity of the pixel of interest being subjected to the luminance gradient direction detection process. Reference numeral 3-18 denotes a first changeover switch for switching the gain of the vertical differential. Reference numeral 3-19 denotes a second changeover switch for switching the gain of the horizontal differential. Reference numeral 3-20 denotes a divider for calculating the ratio of the vertical differential to the horizontal differential of pixel values in the vicinity of the pixel of interest being subjected to the luminance gradient direction detection process, in a state in which the gains of the differentials are properly selected by the selections switches 3-18 and 3-19. Reference numeral 3-21 denotes a table used to calculate arctan of the value output from the divider 3-20. Reference numeral 3-22 denotes a terminal for outputting a luminance gradient direction signal.

Figure 22:
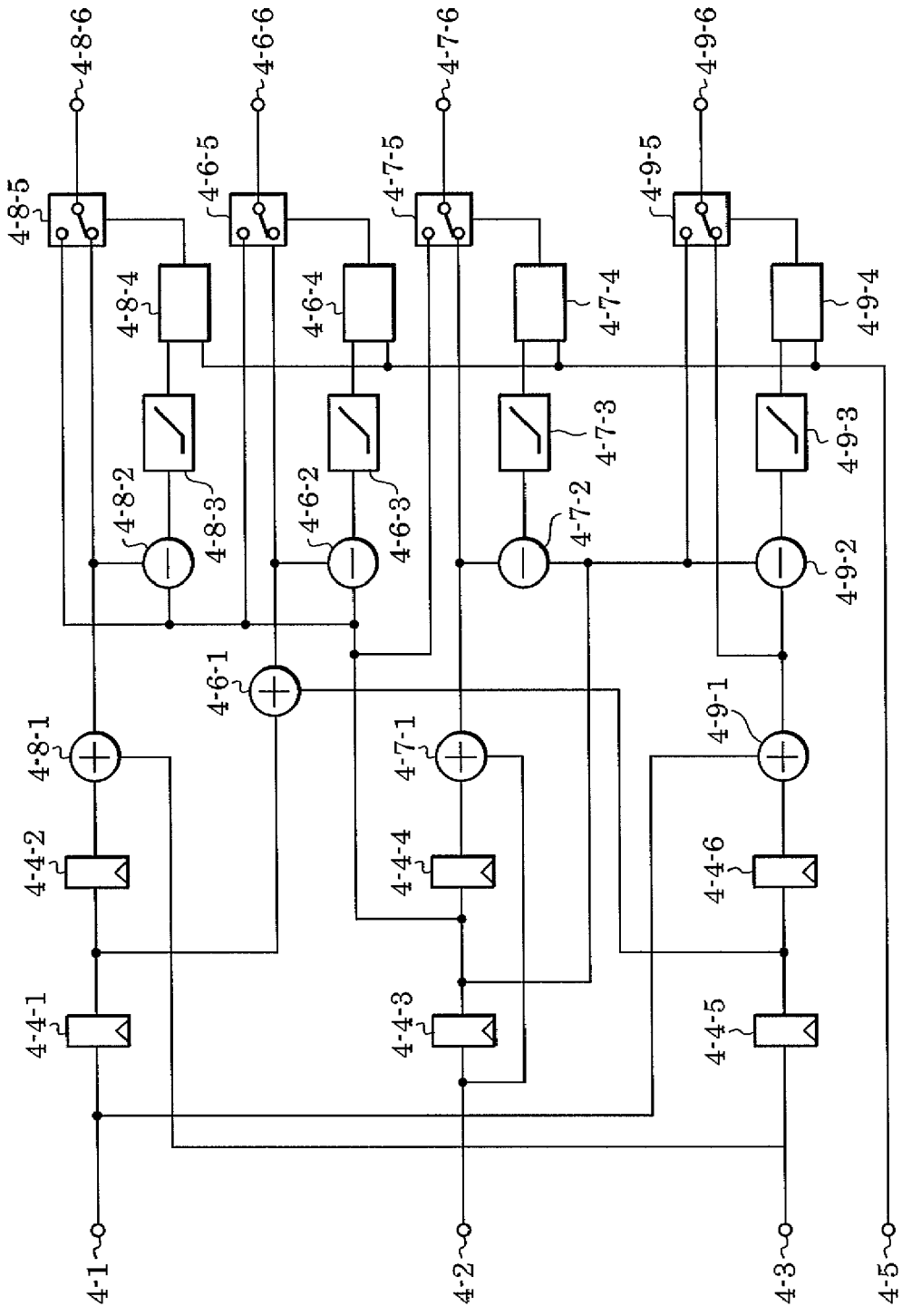
FIG. 22 is a diagram showing the details of a two-dimensional defective pixel detection/correction unit shown in FIG. 19.

FIG. 22 shows the details of the two-dimensional defective pixel detection/correction unit 1-6 shown in FIG. 19.

In FIG. 22, reference numeral 4-1 denotes a first image signal input terminal connected to the output of the first line memory 1-21 shown in FIG. 19. Reference numeral 4-2 denotes a second image signal input terminal connected to the output of the second line memory 1-22 shown in FIG. 19. Reference numeral 4-3 denotes a third image signal input terminal connected to the output of the third line memory 1-23 shown in FIG. 19. Reference numerals 4-4-1 to 4-4-6 denote flip-flops for holding the pixel value of the pixel of interest being subjected to the defective pixel detection/correction process and pixel values of eight neighboring pixels adjacent vertically, horizontally, and diagonally to the pixel of interest.

Reference numeral 4-6-1 denotes a first adder for calculating the mean value of pixel values of two pixels vertically adjacent to the pixel of interest being subjected to the defective pixel detection/correction process. Reference numeral 4-6-2 denotes a first subtractor for calculating the difference between the pixel value of the pixel of interest and the mean value of pixel values of two pixels vertically adjacent to the pixel of interest being subjected to the defective pixel detection/correction process. Reference numeral 4-6-3 denotes a first limiter that clips the difference to 0 when the difference output by the first subtractor 4-6-2 is negative. Reference numeral 4-6-4 denotes a first comparison unit that compares the difference value output from the first limiter 4-6-3 with a threshold value input via a threshold value input terminal 4-5, and outputs a high-level signal when the difference value is greater than the threshold value. Reference numeral 4-6-5 denotes a first switch for selecting the pixel value of the pixel of interest or the mean value of two pixels vertically adjacent to the pixel of interest, in accordance with the signal output from the first comparison unit 4-6-4. Reference numeral 4-6-6 denotes a first output terminal for outputting an image signal that has been subjected to the vertical defective pixel correction and that is output from the first switch 4-6-5.

Reference numeral 4-7-1 denotes a second adder for calculating the mean value of pixel values of two pixels horizontally adjacent to the pixel of interest being subjected to the defective pixel detection/correction process. Reference numeral 4-7-2 denotes a second subtractor for calculating the difference between the pixel value of the pixel of interest and the mean value of pixel values of two pixels horizontally adjacent to the pixel of interest being subjected to the defective pixel detection/correction process. Reference numeral 4-7-3 denotes a second limiter that clips the difference to 0 when the difference output by the second subtractor 4-7-2 is negative. Reference numeral 4-7-4 denotes a second comparison unit that compares the difference value output from the second limiter 4-7-3 with the threshold value input via the threshold value input terminal 4-5, and outputs a high-level signal when the difference value is greater than the threshold value. Reference numeral 4-7-5 denotes a second switch for selecting the pixel value of the pixel of interest or the mean value of two pixels horizontally adjacent to the pixel of interest, in accordance with the signal output from the second comparison unit 4-7-4. Reference numeral 4-7-6 denotes a second output terminal for outputting an image signal that has been subjected to the horizontal defective pixel correction and that is output from the second switch 4-7-5.

Reference numeral 4-8-1 denotes a third adder for calculating the mean value of pixel values of two pixels adjacent in a 45° diagonal direction to the pixel of interest being subjected to the defective pixel detection/correction process. Reference numeral 4-8-2 denotes a third subtractor for calculating the difference between the pixel value of the pixel of interest and the mean value of pixel values of two pixels adjacent in the 45° diagonal direction to the pixel of interest being subjected to the defective pixel detection/correction process. Reference numeral 4-8-3 denotes a third limiter that clips the difference to 0 when the difference output by the third subtractor 4-8-2 is negative. Reference numeral 4-8-4 denotes a third comparison unit that compares the difference value output from the third limiter 4-8-3 with the threshold value input via a threshold value input terminal 4-5, and outputs a high-level signal when the difference value is greater than the threshold value. Reference numeral 4-8-5 denotes a third switch for selecting the pixel value of the pixel of interest or the mean value of two pixels adjacent in the 45° diagonal direction to the pixel of interest, in accordance with the signal output from the third comparison unit 4-8-4. Reference numeral 4-8-6 denotes a third output terminal for outputting an image signal that has been subjected to the 45° diagonal defective pixel correction and that is output from the third switch 4-8-5.

Reference numeral 4-9-1 denotes a fourth adder for calculating the mean value of pixel values of two pixels adjacent in a 135° diagonal direction to the pixel of interest being subjected to the defective pixel detection/correction process. Reference numeral 4-9-2 denotes a fourth subtractor for calculating the difference between the pixel value of the pixel of interest and the mean value of pixel values of two pixels adjacent in the 135° diagonal direction to the pixel of interest being subjected to the defective pixel detection/correction process. Reference numeral 4-9-3 denotes a fourth limiter that clips the difference to 0 when the difference output by the fourth subtractor 4-9-2 is negative. Reference numeral 4-9-4 denotes a fourth comparison unit that compares the difference value output from the fourth limiter 4-9-3 with the threshold value input via the threshold value input terminal 4-5, and outputs a high-level signal when the difference value is greater than the threshold value. Reference numeral 4-9-5 denotes a fourth switch for selecting the pixel value of the pixel of interest or the mean value of two pixels adjacent in the 135° diagonal direction to the pixel of interest, in accordance with the signal output from the fourth comparison unit 4-9-4. Reference numeral 4-9-6 denotes a fourth output terminal for outputting an image signal that has been subjected to the 135° diagonal defective pixel correction and that is output from the fourth switch 4-9-5.

Figure 23:
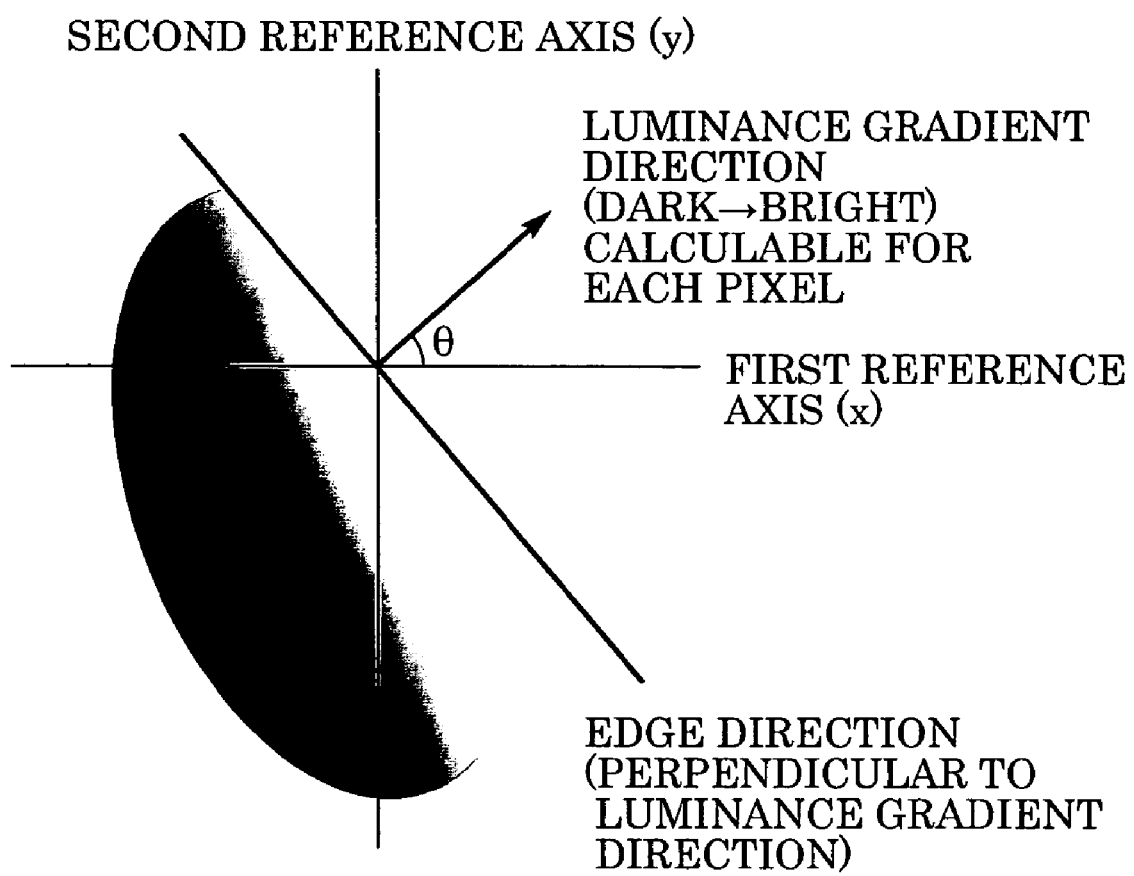
FIG. 23 is a diagram showing a theory of a process of detecting a luminance gradient direction.

FIG. 23 shows the process performed by the luminous gradient direction detector 1-5 shown in FIG. 19.

Referring to FIGS. 19 to 23, the operation of the fourth embodiment will now be described. The image signal output from the image sensor having defective pixels is input via the image signal input terminal 1-1 shown in FIG. 19. The input image signal is input to a series of line memories 1-21 to 1-24, and the image signal is transferred from one line memory to next. The image signal is delayed by one horizontal scan period each time the image signal is transferred from one line memory to next. As a result, a total of five successive image signals each having a length of one horizontal scan period, including the image signal currently input via the input terminal 1-1, are obtained. Those image signals of five successive horizontal scan periods are input to the luminous gradient direction detector 1-5 and also input to the preliminary defective pixel detectors 1-31 to 1-35, respectively.

In addition to the image signals of five successive horizontal scan periods, preliminary detection flags associated with the respective five successive periods generated by the preliminary defective pixel detectors 1-31 to 1-35 in accordance with the first threshold value associated with the preliminary defective pixel detection captured via the input terminal 1-4 are also input to the luminous gradient direction detector 1-5. Based on these image signals and flags, the luminous gradient direction detector 1-5 generates a luminance gradient direction signal for each pixel. Image signals of successive three horizontal scan periods (image signals of three central horizontal scan periods of the five horizontal scan periods) output from the respective line memories 1-21 to 1-23 are input to the two-dimensional defective pixel detection/correction unit 1-6.

The two-dimensional defective pixel detection/correction unit 1-6 extracts three pixel values from each of the image signals of the successive three horizontal scan periods and holds the pixel value of the pixel of interest and pixel values of a total of eight neighboring pixels located vertically, horizontally, and diagonally adjacent to the pixel of interest. Using these pixel values and according to the second threshold value for use in the two-dimensional defective pixel detection captured via the input terminal 1-7, the two-dimensional defective pixel detection/correction unit 1-6 generates a corrected pixel value of the pixel of interest based on the horizontal defective pixel detection, a corrected pixel value of the pixel of interest based on the vertical defective pixel detection, a corrected pixel value of the pixel of interest based on the 45° diagonal defective pixel detection, and a corrected pixel value of the pixel of interest based on the 135° diagonal defective pixel detection. Thus, the correction on the pixel value of the pixel of interest is made in each of four directions. The four corrected values are captured to the switch 1-8. In accordance with the luminance gradient direction signal, the switch 1-8 selects one of the four corrected values and outputs the selected value from the corrected image signal output terminal 1-9.

The preliminary defective pixel detectors 1-31 to 1-35 are exactly the same in structure. Referring to FIG. 20, the operation of each preliminary defective pixel detector is described below.

The image signal input via the image input terminal 2-1 is sequentially delayed and held by the first flip-flop 2-2 and the second flip-flop 2-3, and thus pixel values of total of three pixels are held. The pixel value of the pixel of interest is held by the first flip-flop 2-2. The mean value of the pixel value given by the input image signal 2-1 and the pixel value held by the second flip-flop 2-3. That is, the mean value of left and right pixels directly adjacent to the pixel of interest is calculated by the adder 2-4. The subtractor 2-5 calculates the difference between the pixel value of the pixel of interest and the mean value of adjacent two pixels.

In the present embodiment, white defective pixels are detected and corrected. Therefore, when the difference calculated by the subtractor 2-5 is negative, no correction is made, and the difference value is clipped to 0 by the limiter 2-6. The limiter 2-6 used in the present embodiment may be replaced with the absolute value calculation circuit 2-10 to detect not only a white defective pixel but also a black defective pixel. The difference value output from the limiter 2-6 is compared with the threshold value 2-7. If the difference value output from the limiter 2-6 is greater than the threshold value 2-7, a high-level signal indicating the result of the preliminary defective pixel detection is output from the terminal 2-9. In the case in which the difference value is smaller than the threshold value 2-7, a low-level signal is output.

Referring to FIGS. 21 and 23, the operation of the luminous gradient direction detector 1-5 is described in detail below.

FIG. 23 shows a method of determining a direction, in a two-dimensional plane, in which an image has a greatest change in luminance. If a reference axis (x) is defined in a two-dimensional image as shown in FIG. 23, the angle θ, with respect to this reference axis, of the direction in which the image has the greatest change in luminance at an arbitrary pixel of the two-dimensional image can be mathematically expressed using spatial differentials in two directions and a trigonometric function as follows.

$$\theta = \arctan(\text{diff}Y/\text{diff}X) \quad (14)$$

$$\text{diff}Y = dI(x, y)/dy \quad (15)$$

$$\text{diff}X = dI(x, y)/dx \quad (16)$$

where arctan is the inverse function of tangent function tan, diffX is the spatial differential in the direction along the reference axis x, and diffY is the spatial differential in a direction along a second reference axis y perpendicular to the reference axis x.

Each spatial differential can be obtained using an FIR-type digital filter in accordance with the following equation.

$$\text{diff} = a(-d0 - d1 + d3 + d4) \quad (17)$$

where "a" is the gain determined depending on the sampling frequency. Note that in the present embodiment, "a" disappears when the ratio of two differentials is calculated, and thus the specific value of "a" is not necessary in the present embodiment. "d0", "d1", "d3", and "d4" are pixel values of four pixels vertically or horizontally adjacent to the pixel of interest d2, which does not appear in equation (17). The spatial differentials may also be calculated in accordance with following equations, although the accuracy is not as good as that according to equation (17).

$$\text{diff} = 2a(-d1 + d3) \quad (18)$$

$$\text{diff} = 2a(-d0 + d4) \quad (19)$$

where the gain is increased by a factor to 2 because of the difference in the number of taps.

The angle θ calculated in the above-described manner can continuously vary within the range from 90° to −90° with respect to the reference axis x. That is, by calculating the partial differential of the image in the horizontal direction and the partial differential in the vertical direction, the luminance gradient direction θ with respect to the horizontal direction can be determined. An edge of the image must be perpendicular to the luminance gradient direction (because the luminance change is lowest along the edge), and thus the edge direction can be uniquely determined from the angle θ.

FIG. 21 shows an example of a construction of the calculation unit for calculating the luminance gradient direction according to the method described above with reference to FIG. 23.

The image signals of the successive five horizontal scan periods, originating from the image sensor including defective pixels, given at the image signal input terminal 1-1 or output from the respective line memories 1-21 and 1-24 are input via the respective input terminals 3-1 to 3-5. The preliminary detection flags corresponding to the respective five successive horizontal scan periods are input via the respective input terminals 3-6 to 3-10.

When a preliminary detection flag is generated in each preliminary defective pixel detector shown in FIG. 20, a delay of one pixel occurs. To adjust the phases of the respective image signals input via input terminals 3-1 to 3-5 with respect to the phases of the corresponding temporarily detection flags, the image signals input via input terminals 3-1 to 3-5 are delayed by one pixel by respective flip-flops 3-11-1 to 3-11-5. The image signals of the successive five horizontal scan periods are held by flip-flops 3-12-1 to 3-12-12. More specifically, the pixel value of the pixel of interest is held by the flip-flop 3-12-6, pixel values of four pixels horizontally adjacent to the pixel of interest are held by the respective flip-flops 3-11-3, 3-12-5, 3-12-7, and 3-12-8, and pixel values of four pixels vertically adjacent to the pixel of interest are held by the respective flip-flops 3-12-2, 3-12-4, 3-12-10, and 3-12-12.

On the other hand, preliminary detection flags associated with the pixel of interest and eight neighboring pixels are held such that the preliminary detection flag associated with the pixel of interest is held by the flip-flop 3-13-6, those associated with four horizontally adjacent pixels, two of which are located to the left of the pixel of interest and the other two are located to the right of the pixel of interest, are given or held by the preliminary detection flag 3-8 or the flip-flops 3-13-5, 3-13-7, and 3-13-8, and those associated with four vertically adjacent pixels, two of which are located above the pixel of interest and the other two are located below the pixel of interest, are held by the flip-flops 3-13-2, 3-13-4, 3-13-10, and 3-13-12. The adders 3-16-1 and 3-16-2 and the subtractor 3-16-3 perform the calculation according to equation (17), for four vertically adjacent pixels, two of which are located above the pixel of interest and the other two are located below the pixel of the interest. The adders 3-17-1 and 3-17-2 and the subtractor 3-17-3 perform the calculation according to equation (17), for four horizontally adjacent pixels, two of which are located to the left of the pixel of interest and the other two are located to the right of the pixel of the interest.

In the above calculation, each of the adders 3-16-1 and 3-16-2 calculates the sum of the logical AND of the pixel values (held by the flip-flops 3-12-2, 3-12-4, 3-12-10, and 3-12-12) of four pixels vertically adjacent to the pixel of interest, two of which are located above the pixel of interest and the other two are located below the pixel of interest and the logical NOT of each preliminary detection flag (held by the flip-flops 3-13-2, 3-13-4, 3-13-10, and 3-13-12) corresponding to the four pixels. In this calculation, the logical AND operation is performed by AND devices 3-14-1 to 3-14-4. Note that the preliminary detection flags are inverted before the logical AND operation is performed, because each preliminary detection flag is set to a high level when a corresponding pixel is defective. The logical AND of the preliminary detection flags causes the values of d0 to d4 in equation (17) such that the differential diff is calculated directly using equation (17) when no defective pixel is included in pixel corresponding to d0 to d4, but both d0 and d4 are replaced with 0 when at least one of pixels corresponding to d0 or d4 is defective, and thus the vertical differential diff is given by equation (18). Similarly, when at least one of pixels corresponding to d1 and d3 is defective, both d1 and d3 are replaced with 0, and thus the vertical differential diff is given by equation (19).

In this specific example, it is assumed that there are defective pixels corresponding to d0 and d1 or d3 and d4.

Similarly, in the horizontal direction, each of the adders 3-17-1 and 3-17-2 calculates the sum of the logical AND of the pixel values (held by the flip-flops 3-11-3, 3-12-5, 3-12-7, and 3-12-8) of four pixels horizontally adjacent to the pixel of interest, two of which are located to the left of the pixel of interest and the other two are located to the right of the pixel of interest and the logical NOT of each preliminary detection flag (given via the preliminary detection flag input terminal 3-8 and or held by the flip-flops 3-13-5, 3-13-7, and 3-13-8) corresponding to the four pixels. In this calculation, the logical AND operation is performed by AND devices 3-15-1 to 3-15-4. Thus, the differential is correctly calculated in accordance one of equations (17) to (19) selected depending on whether there is a defective pixel.

The gain of the calculation result of the differential diff according to equation (18) or (19) is one-half that according to equation (17). To adjust the gain, the changeover switches 3-18 and 3-19 switch the gain such that the gain of the result of the calculation of the differential diff is multiplied by 2 when the calculation is performed in accordance with equation (18) or (19).

The divider 3-20 calculates the ratio of the vertical differential output from the changeover switch 3-18 to the horizontal differential output from the changeover switch 3-19. Arctan of the resultant ratio is then calculated using the table 3-21. The resultant value, which indicates the luminance gradient direction θ with respect to the horizontal direction, is output from the luminance gradient direction signal output terminal 3-22. The angle indicated by the luminance gradient direction signal falls within the range of 180° from −90° to 90°, with respect to the horizontal direction taken as 0°.

Now, referring to FIG. 22, the operation of the two-dimensional defective pixel detection/correction unit 1-6 shown in FIG. 19 is described in detail below.

In FIG. 22, the image signals corresponding to the three horizontal lines (in the center of the five horizontal lines of image signals one of which is given at the image signal input terminal 1-1 and the other four are output from the respective line memories 1-21 to 1-24) are input via image signal input terminals 4-1 to 4-3, and the pixel value of the pixel of interest and pixel values of eight adjacent pixels located in vertical, horizontal, and diagonal directions are held by flip-flops 4-4-1 to 4-4-6 (the pixel value of the pixel of interest is held by the flip-flop 4-4-3).

The adder 4-6-1 calculates the mean value of the pixel values (held by the flop-flops 4-4-1 and 4-4-5) of two vertically adjacent pixels, one of which is located above the pixel of interest and the other one is located below the pixel of interest. Thus, the mean value of vertical adjacent pixel values is obtained. The first divider 4-6-2 calculates the difference between the mean value of vertical adjacent pixel values and the pixel value of the pixel of interest. If the resultant difference is negative, the negative value is clipped to 0 by the first limiter 4-6-3 so that the defective pixel correction according to the present embodiment is applied only to white defective pixels.

The first comparison unit 4-6-4 compares the difference value output from the first limiter with the threshold value given via the threshold value input terminal 4-5. If the difference value is greater than the threshold value, the first comparison unit 4-6-4 outputs a high-level signal. If the level of the signal output from the first comparison unit 4-6-4 is high, the pixel of interest is regarded as defective when it is evaluated in the vertical direction, and thus the first switch 4-6-5 selects the signal output from the first adder 4-6-1 and outputs the selected signal. Thus, in this case, the mean value of the pixel values of vertically adjacent two pixels is output as a corrected value for the pixel of interest.

In the case in which a low-level signal is output from the first comparison unit, the pixel of interest is regarded as normal when it is evaluated in the vertical direction, and the pixel value of the pixel of interest held by the flip-flop 4-4-3 is directly output. Thus, the result of the defective pixel detection/correction process based on the evaluation in the vertical direction is output from the first output terminal 4-6-6.

Similarly, the defective pixel detection/correction process based on the evaluation in the horizontal direction on the pixel of interest is performed by the second adder 4-7-1, the second subtractor 4-7-2, the second limiter 4-7-3, the second comparison unit 4-7-4, and the second switch 4-7-5, and the result is output from the second output terminal 4-7-6. The defective pixel detection/correction process based on the evaluation in the 45° diagonal direction on the pixel of interest is performed by the third adder 4-8-1, the third subtractor 4-8-2, the third limiter 4-8-3, the third comparison unit 4-8-4, and the third switch 4-8-5, and the result is output from the third output terminal 4-8-6. The defective pixel detection/correction process based on the evaluation in the 135° diagonal direction on the pixel of interest is performed by the fourth adder 4-9-1, the fourth subtractor 4-9-2, the fourth limiter 4-9-3, the fourth comparison unit 4-9-4, and the fourth switch 4-9-5, and the result is output from the fourth output terminal 4-9-6.

The operation of the changeover switch 1-8 shown in FIG. 19 is described in detail below.

The results of the defective pixel detection/correction process, performed as described above with reference to FIG. 22, based on evaluations in vertical, horizontal, 45° diagonal, and 135° diagonal direction on the pixel of interest are output from the two-dimensional defective pixel detection/correction unit 1-6 shown in FIG. 19 and captured to the changeover switch 1-8. On the other hand, the luminance gradient direction at the pixel of interest being currently subjected to the defective pixel detection/correction process is calculated in the highly reliable fashion as described above with reference to FIG. 21, and the resultant luminance gradient direction signal is used to control the changeover switch 1-8.

In the case in which the luminance gradient direction signal indicates 0°, a greatest change in luminance at the pixel of interest occurs in the horizontal direction, and thus the edge direction is determined to be vertical. In this case, the corrected pixel value based on the evaluation in the vertical direction is selected. In the case in which the luminance gradient direction signal indicates 90° or −90°, the corrected pixel value based on the evaluation in the horizontal direction is selected. In the case in which the luminance gradient direction signal indicates 45°, the corrected pixel value based on the evaluation in the 135° diagonal direction is selected. In the case in which the luminance gradient direction signal indicates −45°, the corrected pixel value based on the evaluation in the 45° diagonal direction is selected. When the luminance gradient direction signal indicates an angle other than the above-described angles, interpolation for obtaining a corrected pixel value of the pixel of interest is performed in the closest one of the four directions. In the present embodiment, as described above, because the edge direction is detected after the preliminary detection/correction, the edge direction can be detected with a small error. Furthermore, because the correction is made in a direction in which there is high correlation among pixel values, a highly reliable corrected value can be obtained.

In the present embodiment, as described above, the defective pixel detection/correction is performed in a very reliable fashion based on the evaluation along an edge direction of a subject.

Fifth Embodiment

Figure 24:
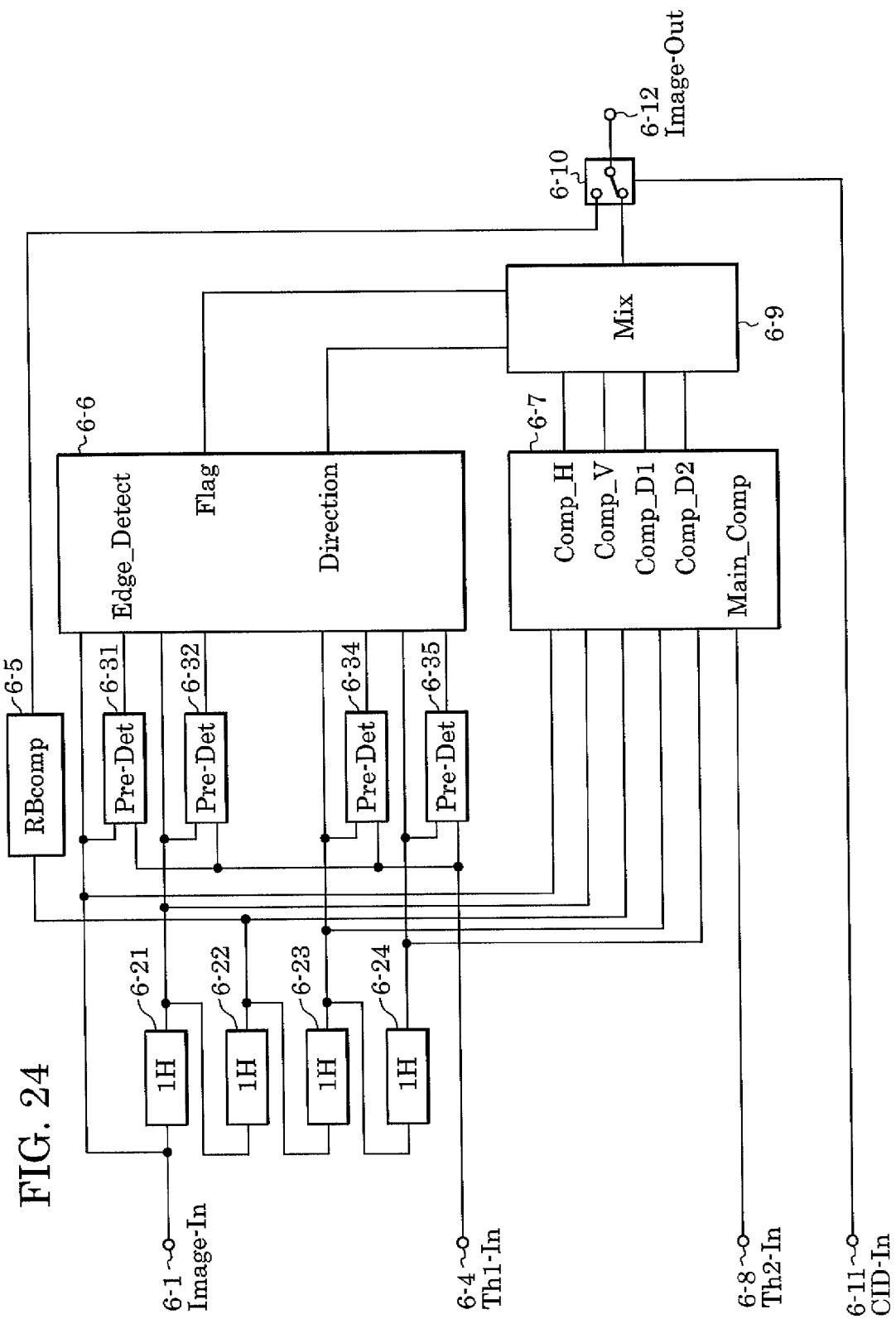
FIG. 24 is a schematic block diagram of an image processing apparatus according to an embodiment of the present invention.

FIG. 24 shows a fifth embodiment of an image processing apparatus for defective pixel detection/correction of G pixels of an RGB Bayer array of a single-plate image sensor of a color imaging device, to correctly detect a G defective pixel, incorrect detection of which would cause significant degradation in image quality.

In FIG. 24, reference numeral 6-1 denotes an image signal input terminal for receiving an image signal output from an image sensor (not shown). Reference numeral 6-21 denotes a first line memory, reference numeral 6-22 denotes a second line memory, reference numeral 6-23 denotes a third line memory, and reference numeral 6-24 denotes a fourth line memory. Reference numeral 6-31 denotes a first preliminary defective pixel detector, reference numeral 6-32 denotes a second preliminary defective pixel detector, reference numeral 6-34 denotes a third preliminary defective pixel detector, and reference numeral 6-35 denotes a fourth preliminary defective pixel detector. Reference numeral 6-4 denotes a first threshold value input terminal for inputting a first threshold value used for preliminary defective pixel detection. Reference numeral 6-5 denotes an R/B defective pixel correction unit, while reference numeral 6-6 denotes a luminous gradient direction detector for detecting a luminance gradient direction perpendicular to an edge direction of an image.

Reference numeral 6-7 denotes a two-dimensional defective pixel detection/correction unit. Reference numeral 6-8 denotes a second threshold value input terminal for inputting a second threshold value used for two-dimensional defective pixel detection. Reference numeral 6-9 denotes a signal mixer. Reference numeral 6-10 denotes a changeover switch for switching connection between G pixels and RB pixels. Reference numeral 6-11 denotes an input terminal for inputting an identification signal of a G pixel and an identification signal of RB pixel. Reference numeral 6-12 denotes a terminal for outputting a corrected image signal.

Figure 25:
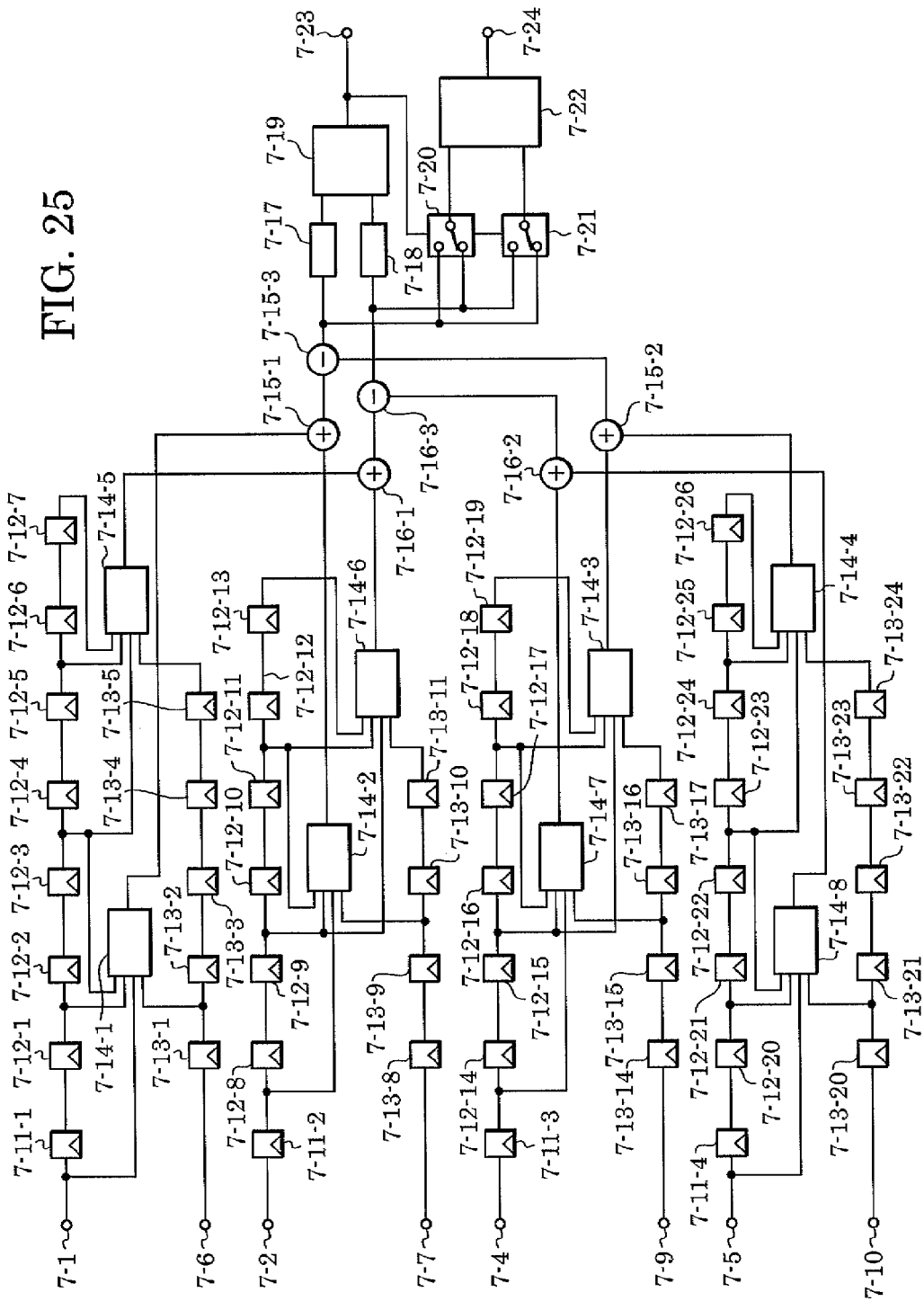
FIG. 25 is a diagram showing the details of a luminous gradient direction detector for detecting a luminance gradient direction perpendicular to an edge of an image.

FIG. 25 shows the details of the luminous gradient direction detector 6-6 for detecting a luminance gradient direction perpendicular to an edge of an image shown in FIG. 24.

In FIG. 25, reference numeral 7-1 denotes a first image signal input terminal connected to the image signal input terminal 6-1 shown in FIG. 24. Reference numeral 7-2 denotes a second image signal input terminal connected to the output of the first line memory 6-21 shown in FIG. 24. Reference numeral 7-4 denotes a third image signal input terminal connected to the output of the third line memory 6-23 shown in FIG. 24. Reference numeral 7-5 denotes a fourth image signal input terminal connected to the output of the fourth line memory 6-24 shown in FIG. 24. Reference numeral 7-6 denotes a first preliminary detection flag input terminal connected to the output of the first preliminary defective pixel detector 6-31 shown in FIG. 24. Reference numeral 7-7 denotes a second preliminary detection flag input terminal connected to the output of the second preliminary defective pixel detector 6-32 shown in FIG. 24. Reference numeral 7-9 denotes a third preliminary detection flag input terminal connected to the output of the third preliminary defective pixel detector 6-34 shown in FIG. 24. Reference numeral 7-10 denotes a fourth preliminary detection flag input terminal connected to the output of the fourth preliminary defective pixel detector 6-35 shown in FIG. 24.

Reference numerals 7-11-1 to 7-11-4 denote flip-flops for adjusting phases between input image signals 7-1 to 7-5 and corresponding input preliminary detection flags 7-6 to 7-10. Reference numerals 7-12-1 to 7-12-7 denote flip-flops for holding G pixel values of a total of five pixels in a line located two lines above a line in which the pixel to be used in the luminance gradient direction detection process is located. Reference numerals 7-12-8 to 7-12-13 denote flip-flops for holding G pixel values of a total of four pixels in a line located directly above the line in which the pixel to be used in the luminance gradient direction detection process is located. Reference numerals 7-12-14 to 7-12-19 denote flip-flops for holding G pixel values of a total of four pixels in a line located directly below the line in which the pixel to be used in the luminance gradient direction detection process is located.

Reference numerals 7-12-20 to 7-12-26 denote flip-flops for holding G pixel values of a total of five pixels in a line located two lines below the line in which the pixel to be used in the luminance gradient direction detection process is located. Reference numerals 7-13-1 to 7-13-5 denote flip-flops for holding preliminary detection flags corresponding to the respective G pixels in the line located two lines above the line in which the pixel to be used in the luminance gradient direction detection process is located.

Reference numerals 7-13-8 to 7-13-11 denote flip-flops for holding preliminary detection flags corresponding to the respective G pixels in the line located directly above the line in which the pixel to be used in the luminance gradient direction detection process is located. Reference numerals 7-13-14 to 7-13-17 denote flip-flops for holding preliminary detection flags corresponding to the respective G pixels in the line located directly below the line in which the pixel to be used in the luminance gradient direction detection process is located. Reference numerals 7-13-20 to 7-13-24 denote flip-flops for holding preliminary detection flags corresponding to the respective G pixels in the line located two lines below the line in which the pixel to be used in the luminance gradient direction detection process is located.

Reference numerals 7-14-1 to 7-14-4 denote correction blocks that makes a correction if four G pixels adjacent in the 135° diagonal direction to a pixel to be used in the luminance gradient direction detection process includes a defective pixel, before the luminance gradient direction detection process is performed. Reference numerals 7-14-5 to 7-14-8 denote correction blocks that makes a correction if four G pixels adjacent in the 45° diagonal direction to a pixel to be used in the luminance gradient direction detection process includes a defective pixel, before the luminance gradient direction detection process is performed.

Reference numerals 7-15-1 to 7-15-3 denote adder/subtractor circuits that determine the differential using a total of four G pixels adjacent in the 135° diagonal direction. Reference numerals 7-16-1 to 7-16-3 denote adder/subtractor circuits that determine the differential using a total of four G pixels adjacent in the 45° diagonal direction. Reference numeral 7-17 denotes a first absolute value calculation circuit. Reference numeral 7-18 denotes a second absolute value calculation circuit. Reference numeral 7-19 denotes a comparison unit. Reference numeral 7-20 denotes a first changeover switch. Reference numeral 7-21 denotes a second changeover switch. Reference numeral 7-22 denotes a divider. Reference numeral 7-23 denotes a luminance gradient direction flag output terminal. Reference numeral 7-24 denotes a luminance gradient direction signal output terminal.

Figure 26:
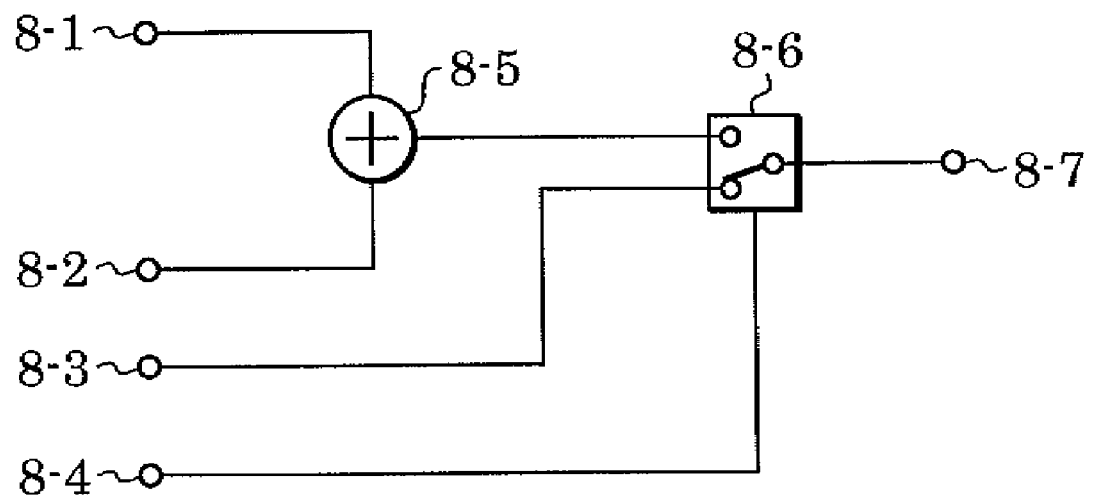
FIG. 26 is a diagram showing the details of a correction block shown in FIG. 25.

Each of the correction blocks 7-14-1 to 7-14-8 shown in FIG. 25 has an internal structure shown in FIG. 26.

In FIG. 26, reference numerals 8-1 and 8-2 denote adjacent pixel input terminals. Reference numeral 8-3 denotes a central pixel input terminal. Reference numeral 8-4 denotes a preliminary detection flag input terminal. Reference numeral 8-5 denotes an adder for calculating the mean value. Reference numeral 8-6 denotes a changeover switch. Reference numeral 8-7 denotes a corrected signal output terminal.

FIG. 24 shows the details of the two-dimensional defective pixel detection/correction unit 6-7.

Figure 27:
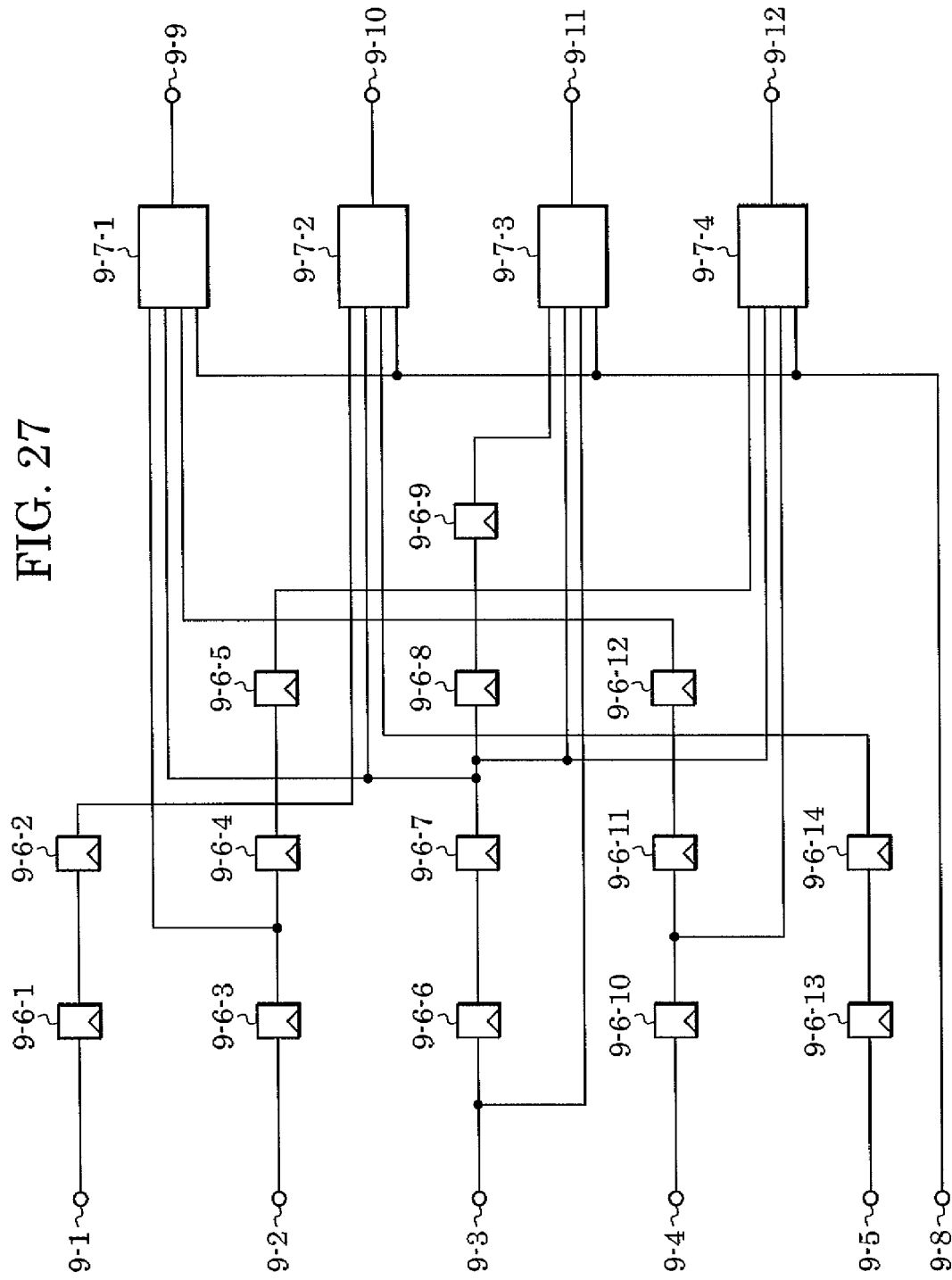
FIG. 27 is a diagram showing the details of a two-dimensional defective pixel detection/correction unit shown in FIG. 24.

In FIG. 27, reference numeral 9-1 denotes a first image signal input terminal connected to the image signal input terminal 6-1 shown in FIG. 24. Reference numeral 9-2 denotes a second image signal input terminal connected to the output of the first line memory 6-21 shown in FIG. 24. Reference numeral 9-3 denotes a third image signal input terminal connected to the output of the second line memory 6-22 shown in FIG. 24. Reference numeral 9-4 denotes a fourth image signal input terminal connected to the output of the third line memory 6-23 shown in FIG. 24. Reference numeral 9-5 denotes a fifth image signal input terminal connected to the output of the fourth line memory 6-24 shown in FIG. 24.

Reference numerals 9-6-1 to 9-6-14 denote flip flops for holding the pixel value of the pixel of interest being subjected to the defective pixel detection/correction process, and pixel values of a total of thirteen neighboring pixels around the pixel of interest, the neighboring pixels including four vertically adjacent pixels, four horizontally adjacent pixels, two 45° diagonally adjacent pixels, and two 135° diagonally adjacent pixels.

Reference numeral 9-7-1 denotes a first detection/correction circuit for determining whether the pixel of interest is defective by examining pixels located in a 135° diagonal direction and for making a correction if it is defective. Reference numeral 9-7-2 denotes a second detection/correction circuit for determining whether the pixel of interest is defective by examining pixels located in a vertical direction and for making a correction if it is defective. Reference numeral 9-7-3 denotes a third detection/correction circuit for determining whether the pixel of interest is defective by examining pixels located in a horizontal direction and for making a correction if it is defective. Reference numeral 9-7-4 denotes a fourth detection/correction circuit for determining whether the pixel of interest is defective by examining pixels located in a 45° diagonal direction and for making a correction if it is defective.

Reference numeral 9-8 denotes a threshold value input terminal connected to the second threshold value input terminal for two-dimensional defective pixel detection shown in FIG. 24. Reference numeral 9-9 denotes an output terminal for outputting a 135° diagonal corrected image signal. Reference numeral 9-10 denotes an output terminal for outputting a vertical corrected image signal. Reference numeral 9-11 denotes an output terminal for outputting a horizontal corrected image signal. Reference numeral 9-12 denotes an output terminal for outputting a 45° diagonal corrected image signal.

Figure 28:
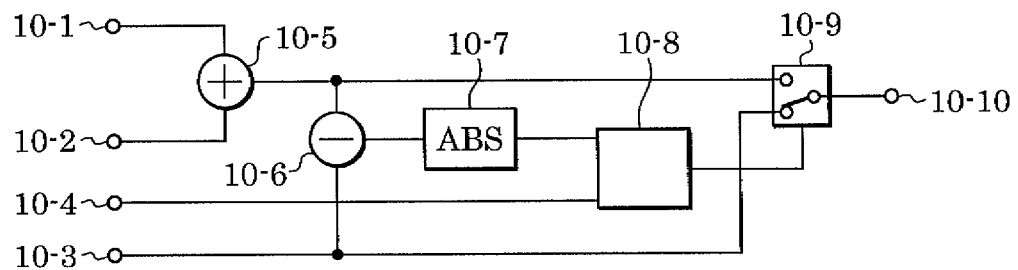
FIG. 28 is a diagram showing the details of a detection/correction circuit shown in FIG. 27.

Each of the detection/correction circuits 9-7-1 to 9-7-4 shown in FIG. 27 has an internal structure shown in FIG. 28.

In FIG. 28, reference numerals 10-1 and 10-2 denote image signal input terminals for inputting pixel values of pixels adjacent to the pixel of interest subjected to the defective pixel detection/correction process. Reference numeral 10-3 denotes an image signal input terminal for inputting the pixel value of a pixel of interest subjected to the defective pixel detection/correction process. Reference numeral 10-4 denotes a threshold value input terminal. Reference numeral 10-5 denotes an adder for calculating the mean value of pixel values of adjacent pixels. Reference numeral 10-6 denotes a subtractor for calculating the difference between the average and the pixel value of the pixel of interest. Reference numeral 10-7 denotes an absolute value calculation circuit. Reference numeral 10-8 denotes a comparison unit. Reference numeral 10-9 denotes a changeover switch. Reference numeral 10-10 denotes a terminal for outputting a corrected image signal.

Figure 29:
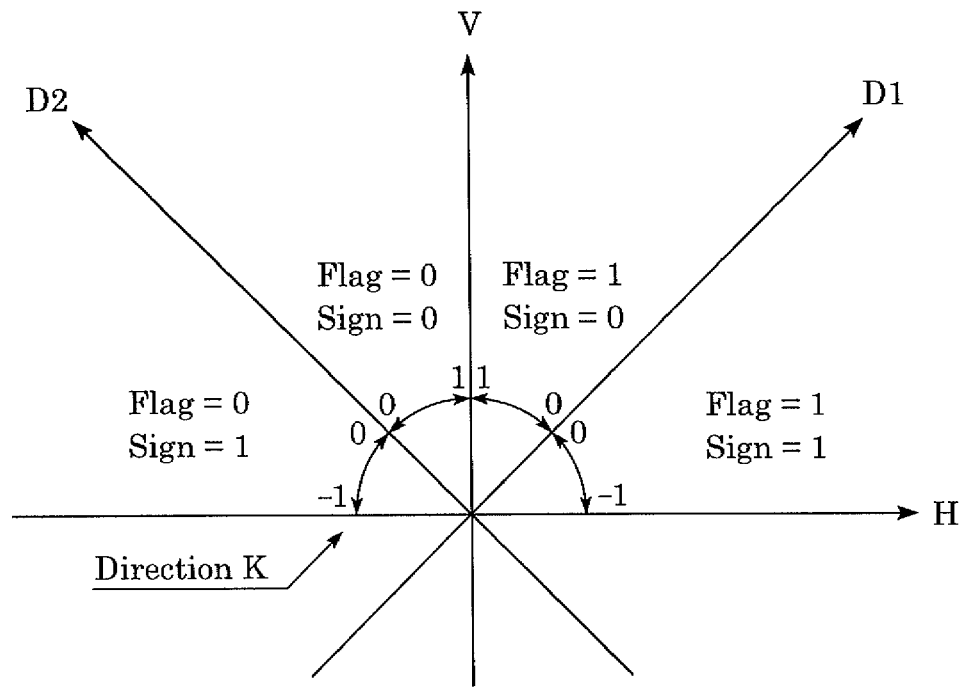
FIG. 29 is a diagram showing a manner in which a signal mixer shown in FIG. 24 mixes corrected image signals.

FIG. 29 is a diagram showing the process performed by the signal mixer 6-9 shown in FIG. 24 to mix corrected image signals 9-9 to 9-12 shown in FIG. 27, in accordance with the luminance gradient direction signal and the luminance gradient direction flag.

Referring to FIGS. 24 to 29, the operation of the fifth embodiment of the present invention is described below.

The image signal output from the image sensor having defective pixels is input via the image signal input terminal 6-1 shown in FIG. 24. The input image signal is input to a series of line memories 6-21 to 6-24, and the image signal is transferred from one line memory to next. The image signal is delayed by one horizontal scan period each time the image signal is transferred from one line memory to next. As a result, a total of five image signals of successive horizontal scan periods, including the image signal given at the input terminal 6-1, are obtained. The five successive image signals are input to the 2-dimensional defective pixel detection/correction unit 6-7. Using these five successive image signals, the 2-dimensional defective pixel detection/correction unit 6-7 performs the defective pixel detection/correction process on the pixel of interest in four directions, that is, in vertical, horizontal, 45° diagonal and 135° diagonal directions, and outputs resultant values corrected in the respective four directions. The details of the detection/correction process will be described later with reference to FIGS. 27 and 28.

Of the five successive image signals each corresponding to one horizontal scan line, the image signal corresponding to the central horizontal line is output from the second line memory 6-22 and captured to the R/B defective pixel detection/correction unit 6-5 and subjected to a defective pixel detection/correction process similar to the conventional process. Four image signals other than the image signal of the central scan line are captured to the preliminary defective pixel detection/correction units 6-31 to 6-35, respectively. These four image signals are also captured to the luminous gradient direction detector 6-6 for detecting the luminance gradient direction perpendicular to the edge direction of the image. Using these image signals, the luminous gradient direction detector 6-6 generates a luminance gradient direction signal indicating a luminance gradient direction at the pixel of interest and also generates a luminance gradient direction flag. The details of the process will be described later with reference to FIGS. 25 and 26.

The corrected image signals corrected in the respective four directions, that is, vertical, horizontal, 45° diagonal, and 135° diagonal direction, the luminance gradient direction signal, and the luminance gradient direction flag are captured to the signal mixer 6-9. In accordance with the luminance gradient direction signal and the luminance gradient direction flag, the mixer 6-9 mixes the image signals preliminarily corrected in the respective four directions and outputs the result as a two-dimensionally corrected signal, as will be described in further detail later with reference to FIG. 29. In the present embodiment, the two-dimensionally corrected signal is effective only for G pixels. Therefore, in accordance with the identification signal 6-11 indicating whether the image signal is of a G pixel or an RB pixel, the changeover switch 6-10 selects the two-dimensionally corrected signal or the signal output from the R/B defective pixel detection/correction unit 6-5 and outputs the selected signal from the corrected image signal output terminal 6-12.

Now, the details of each part are described below. FIG. 27 shows the details of the two-dimensional defective pixel detection/correction unit 6-7 shown in FIG. 24. In FIG. 27, the image signals corresponding to five successive horizontal scan periods are captured via the respective image signal input terminals 9-1 to 9-5. Pixel values of a plurality of pixels in each horizontal scan line are held by flip-flops 9-6-1 to 9-6-14. More specifically, the image signal having a delay of two horizontal scan periods and input via the third image signal input terminal 9-2 is of a central horizontal scan line including the pixel of interest being currently subjected to the defective pixel detection/correction process, and pixel values of a total of five pixels in this line, that is, the pixel of interest, two pixels to the left of the pixel of interest, and two pixels to the right of the pixel of interest are held (at the input terminal 9-3 and by flip-flops 9-6-6 to 9-6-9). The pixel value of the pixel of interest is held by the flip-flop 9-6-7.

In each line directly above or below the center line in which the pixel of interest is located, pixel values of a total of three pixels, the central one of which is located at the same horizontal position as the pixel of interest, are held (by flip-flops 9-6-3 to 9-6-5 or flip-flops 9-6-10 to 9-6-12). In each further upper or lower line, the pixel value of one pixel located at the same horizontal position as that of the pixel of interest is held (by the flip-flop 9-6-2 or 9-6-14). Note that flip-flops 9-6-1 and 9-6-13 are for adjustment of signal delay.

In the present embodiment, as described above, the present invention is applied to the defective pixel detection/correction of G pixels of the RGB Bayer array of the single-plate image sensor of the color imaging device, to correctly detect a G defective pixel, incorrect detection of which would cause significant degradation in image quality. When the pixel of interest is a G pixel, G pixels are given at image signal input terminals 9-1 to 9-5 or held by the flip-flops 9-6-1 to 9-6-14 as follows.

Pixel values of G pixels vertically adjacent to the pixel of interest are held by the flip-flops 9-6-2 and 9-6-14. One of pixel values of G pixels horizontally adjacent to the pixel of interest is given at the image signal input terminal 9-3, and the other one is held by the flip-flop 9-6-9. Pixel values of G pixels adjacent in the 45° diagonal direction to the pixel of interest are held by the flip-flops 9-6-10 and 9-6-5. Pixel values of G pixels adjacent in the 135° diagonal direction to the pixel of interest are held by the flip-flops 9-6-3 and 9-6-12.

Of these pixel values, pixel values of G pixels adjacent in the 135° diagonal direction to the pixel of interest are captured to the first detection/correction circuit 9-7-1. Pixel values of G pixels vertically adjacent to the pixel of interest are captured to the second detection/correction circuit 9-7-2. Pixel values of G pixels horizontally adjacent to the pixel of interest are captured to the third detection/correction circuit 9-7-3. Pixel values of G pixels adjacent in the 45° diagonal direction to the pixel of interest are captured to the fourth detection/correction circuit 9-7-4.

As shown in FIG. 28, the mean value of pixel values of adjacent pixels is calculated in each of the four directions, and each mean value is compared with the pixel value of interest, and a determination of whether the pixel of interest is made based on whether the difference between the mean value and the pixel value of the pixel interest is greater than the threshold value. If the pixel of interest is determined to be defective, the mean value of pixel values of adjacent pixels is employed as a corrected pixel value instead of the original pixel value. Thus, corrected pixel values based on the evaluation in the respective four directions, that is, vertical, horizontal, 45° diagonal, and 135° diagonal directions are output from the respective output terminals 9-9 to 9-12.

Now referring to FIGS. 25 and 20, the operation of the luminous gradient direction detector 6-6 shown in FIG. 24 is described in detail below.

Image signal of four horizontal scan lines including image signals of two upper lines above the central line in which the pixel of interest being subjected to the defective pixel detection/correction process is located and image signals of lower two lines below the central line are input to the luminous gradient direction detector 6-7 via the image signal input terminals 7-1 to 7-5. The phases of these image signals of four lines relative to the phases of the preliminary detection flags described later are adjusted by the flip-flops 7-11-1 to 7-11-4.

Thereafter, pixel values of a plurality of pixels in each line are held by the flip-flops 7-12-1 to 7-12-26. Note that the pixel value of the pixel of interest being subjected to the defective pixel detection/correction process is not input to the luminous gradient direction detector 6-6. When the pixel of interest is a G pixel, of the pixel values given at the image signal input terminals 7-1 to 7-5 and the pixel values held by the flip-flops 7-12-1 to 7-12-26, the following pixel values are of G pixels.

In the line two lines above the central line in which the pixel of interest is located, the pixel value given at the image signal input terminal 7-1 and the pixel values held by the flips-flops 7-12-1, 7-12-3, 7-12-5, and 7-12-7 are of G pixels. In the line directly above the central line, the pixel values held by the flips-flops 7-11-2, 7-12-9, 7-12-11, and 7-12-13 are of G pixels. In the line directly below the central line, the pixel values held by the flips-flops 7-11-3, 7-12-15, 7-12-17, and 7-12-19 are of G pixels. In the line two lines below the central line, the pixel value given at the image signal input terminal 7-5 and the pixel values held by the flips-flops 7-12-20, 7-12-22, 7-12-24, and 7-12-26 are of G pixels.

To detect the luminance gradient direction at the pixel of interest, as described earlier with reference to FIG. 23, it is necessary to calculate the differentials along two reference axes. In the present embodiment, the two reference axes are selected taking into account the feature of the arrangement of G pixels in the RGB Bayer array.

When the pixel of interest is evaluated relative to pixel values of adjacent pixels located in 45° and 135° diagonal directions, the distance from the pixel of interest to G pixels becomes shortest. Thus, these two directions are employed as the reference axes. To calculate the differential in the 45° diagonal direction, G pixel values held by the flip-flops 7-12-5, 7-12-11, 7-12-15, and 7-12-20 are used. On the other hand, the differential in the 135° diagonal direction is calculated using G pixel values held by the flip-flops 7-12-1, 7-12-9, 7-12-17, and 7-12-24. That is, the differential is calculated using pixel values of four pixels adjacent to the pixel of interest in each direction. More specifically, the differential in the 45° diagonal direction is calculated using the pixel values held by the flip-flops 7-12-5, 7-12-11, 7-12-15, and 7-12-20 in accordance with equation (17), and the differential in the 135° diagonal direction is calculated using the pixel values held by the flip-flops 7-12-1, 7-12-9, 7-12-17, and 7-12-24.

If a defective pixel is included in the pixels whose pixel values are held by the flip-flops 7-12-5, 7-12-11, 7-12-15, and 7-12-20 or flip-flops 7-12-1, 7-12-9, 7-12-17, and 7-12-24, the differential cannot be correctly calculated. To avoid the above problem, instead of directly using the pixel values held by the flip-flops 7-12-5, 7-12-11, 7-12-15, and 7-12-20 or the flip-flops 7-12-1, 7-12-9, 7-12-17, 7-12-24, the differentials are calculated after correcting these values. More specifically, the correction blocks 7-14-1 to 7-14-8 corrects the pixel value of each pixel using pixel values of two G pixels horizontally adjacent, on the left and right sides, to each pixel, and the differentials are calculated using the corrected pixel values.

A determination of whether the correction is made by each correction block is made based on the preliminary detection flag corresponding to each pixel. The preliminary detection flags are input via the detection flag input terminals 7-6 to 7-10 and held by the flip-flops 7-13-1 to 7-13-24. The preliminary detection flags are generated in a similar manner as described above in the fourth embodiment with reference to FIG. 20. When a defective pixel is found, a corresponding preliminary detection flag is set to a high logical level. Note that in the present embodiment, the absolute value calculation circuit 2-10 shown in FIG. 20 to set the preliminary detection flag to the high logical level when a defective pixel is found regardless of whether the detected defective pixel is a white or black defective pixel.

Signals are input to respective correction blocks as described below. Note that for simplicity, pixels and corresponding pixel values are denoted by the same reference numerals as those of the flip-flops. For example, the pixel value 7-12-1 is that held by the flop-flop 7-12-1. To the correction block 7-14-1, the pixel value 7-12-1, the pixel value of a G pixel 7-1 horizontally adjacent to the pixel 7-12-1, the pixel value 7-12-3, and the preliminary detection flag 7-13-1 corresponding to the pixel 7-12-1 are input. To the correction block 7-14-2, the pixel value 7-12-9, the pixel value of a G pixel 7-11-2 horizontally adjacent to the pixel 7-12-9, the pixel value 7-12-11, and the preliminary detection flag 7-13-9 corresponding to the pixel 7-12-9 are input. To the correction block 7-14-3, the pixel value 7-12-17, the pixel value of a G pixel 7-12-15 horizontally adjacent to the pixel 7-12-17, the pixel value 7-12-19, and the preliminary detection flag 7-13-17 corresponding to the pixel 7-12-17 are input. To the correction block 7-14-4, the pixel value 7-12-24, the pixel value of a G pixel 7-12-22 horizontally adjacent to the pixel 7-12-24, the pixel value 7-12-26, and the preliminary detection flag 7-13-24 corresponding to the pixel 7-12-24 are input. To the correction block 7-14-5, the pixel value 7-12-5, the pixel value of a G pixel 7-12-3 horizontally adjacent to the pixel 7-12-5, the pixel value 7-12-7, and the preliminary detection flag 7-13-5 corresponding to the pixel 7-12-5 are input. To the correction block 7-14-6, the pixel value 7-12-11, the pixel value of a G pixel 7-12-9 horizontally adjacent to the pixel 7-12-11, the pixel value 7-12-13, and the preliminary detection flag 7-13-11 corresponding to the pixel 7-12-11 are input. To the correction block 7-14-7, the pixel value 7-12-15, the pixel value of a G pixel 7-11-3 horizontally adjacent to the pixel 7-12-15, the pixel value 7-12-17, and the preliminary detection flag 7-13-15 corresponding to the pixel 7-12-15 are input. To the correction block 7-14-8, the pixel value 7-12-20, the pixel value of a G pixel 7-5 horizontally adjacent to the pixel 7-12-20, the pixel value 7-12-22, and the preliminary detection flag 7-13-20 corresponding to the pixel 7-12-20 are input.

All correction blocks 7-14-1 to 7-14-8 have the same internal structure shown in FIG. 26. In FIG. 26, pixel values of horizontally adjacent G pixels are input via the adjacent pixel value input terminals 8-1 and 8-2. The pixel value of the G pixel to be used in the differential calculation is input via the central pixel value input terminal 8-3. The preliminary detection flag is input via the preliminary detection flag input terminal 8-4. The adder 8-5 calculates the mean value of the pixel values input via the input terminals 8-1 and 8-2. When the preliminary detection flag is high, that is, when the G pixel to be used in the differential calculation is regarded as defective, the changeover switch 8-6 selects the mean value of adjacent G pixels and outputs it.

Thus, an influence of a defective G pixel on the calculation of the differentials is suppressed. Using these G pixel values, the adder/subtractor circuits 7-15-1 to 7-15-3 and 7-16-1 to 7-16-3 calculate the differentials according to equation (17) in the 45° and 135° diagonal directions. The absolute value of each of these two differentials is determined by the absolute value calculation circuit 7-17 or 7-18. The comparison unit 7-19 determines in which direction the differential has a greater value.

The result of the determination made by the comparison unit 7-19 is output from the luminance gradient direction flag output terminal 7-23 and is used to control the changeover switches 7-20 and 7-21. The changeover switches 7-20 and 7-21 switches the differential values input to the divider 7-22 such that the denominator becomes greater than the numerator. More specifically, when the differential in the 45° diagonal direction is greater than the differential in the 135° diagonal direction, the changeover switches 7-20 and 7-21 switch the differentials such that the ratio of the differential in the 135° diagonal direction to the differential in the 45° diagonal direction to the is calculated by the divider 7-22.

On the other hand, when the differential in the 135° diagonal direction is greater than the differential in the 45° diagonal direction, the changeover switches 7-20 and 7-21 switch the differentials such that the ratio of the differential in the 45° diagonal direction to the differential in the 135° diagonal direction to the is calculated by the divider 7-22. When the values input to the divider 7-22 are controlled such that the denominator is always greater than the numerator, the result of the division becomes nearly equal to arctan of the division, and thus it becomes possible to directly employ the result of the division as the luminance gradient direction signal without calculating arctan according to equation (14). When the denominator is greater than the numerator, the luminance gradient direction signal falls within the range of ±1. The luminance gradient direction signal obtained in the above-described manner is output from the luminance gradient direction signal output terminal 7-24.

Now, the operation of the signal mixer 6-9 shown in FIG. 24 is described in detail below.

If it is assumed that the luminance gradient direction flag is set to be a high logical level when the differential in the 45° diagonal direction is greater than the differential in the 135° diagonal direction, the signal mixer 6-9 shown in FIG. 24 operates as follows.

FIG. 29 shows the concepts of the operation. As shown in FIG. 29, when the flag is set to the logical high level, the 45° diagonal direction (denoted by d1 in FIG. 29) is taken as an axis indicating 0° of the luminance gradient direction. On the other hand, when the flag is set to the logical low level, the 135° diagonal direction (denoted by d2 in FIG. 29) is taken as an axis indicating 0° of the luminance gradient direction. Therefore, for example, when the luminance gradient direction is equal to 45°, the luminance gradient direction signal is equal to 0 and the luminance gradient direction flag is set to the logical high level. On the other hand, when the luminance gradient direction is equal to 135°, the luminance gradient direction signal is equal to 0 and the luminance gradient direction flag is set to the logical low level.

In the range from the 45° diagonal direction to the vertical direction (denoted by V in FIG. 29), the luminance gradient direction flag is high, and the luminance gradient direction signal has a value from 0 to 1. In the range from the 45° diagonal direction to the horizontal direction (denoted by H in FIG. 29), the luminance gradient direction flag is high, and the luminance gradient direction signal has a value from 0 to −1.

In the range from the 135° diagonal direction to the vertical direction, the luminance gradient direction flag is low, and the luminance gradient direction signal has a value from 0 to 1. In the range from the 135° diagonal direction to the horizontal direction, the luminance gradient direction flag is low, and the luminance gradient direction signal has a value from 0 to −1.

As described above, the pixel values corrected based on the evaluation in the respective vertical, horizontal, 45° diagonal, and 135° diagonal directions for the pixel of interest are determined by the two-dimensional defective pixel detection/correction unit 6-7 shown in FIG. 24 are input to the signal mixer 6-9 shown in FIG. 24. The signal mixer 6-9 produces a two-dimensionally corrected pixel value by mixing the input four corrected pixel values as described below.

When the flag is high and the luminance gradient direction signal is positive, a greatest change in luminance at the pixel of interest being subjected to the defect pixel detection/correction process occurs in a direction between the 45° diagonal direction and the vertical direction. Therefore, in this case, the two-dimensionally corrected pixel value is produced by calculating the weighted sum of the pixel value corrected based on the evaluation in the horizontal direction and the pixel value corrected based on the evaluation in the 135° diagonal direction by using the absolute value of the luminance gradient direction signal as the gain. This allows the defective pixel correction to be made without causing significant degradation in edge image quality.

When the flag is high and the luminance gradient direction signal is negative, the weighted sum of the pixel value corrected based on the evaluation in the vertical direction and the pixel value corrected based on the evaluation in the 135° diagonal direction is calculated. When the flag is low and the luminance gradient direction signal is positive, the weighted sum of the pixel value corrected based on the evaluation in the horizontal direction and the pixel value corrected based on the evaluation in the 45° diagonal direction is calculated. When the flag is low and the luminance gradient direction signal is negative, the weighted sum of the pixel value corrected based on the evaluation in the vertical direction and the pixel value corrected based on the evaluation in the 45° diagonal direction is calculated.

In the present embodiment, as described above, G defective pixels, incorrect detection of which would cause significant degradation in image quality, are correctly detected and properly corrected, and thus a high-quality image can be obtained.

In the present invention, as described above with reference to specific embodiments, even when there is a defective pixel in an area in which an edge direction is detected, degradation in edge detection accuracy due to the defective pixel can be minimized, and it is not necessary that information indicating the location of the defective pixel be stored in a nonvolatile memory. Thus, it is possible to remove the process of writing information indicating the location of the defective pixel in the nonvolatile memory. This allows a great improvement in productivity of the imaging device.

In the case of the technique of correcting defective pixels using a nonvolatile memory, it is necessary to handle pixel defects that occur after the production of the image sensor is completed. That is, it is necessary to store information associated with additional defective pixels, for example, as disclosed in Japanese Patent Laid-Open No. 2001-218115, or Japanese Patent Laid-Open No. 2001-257939. In contrast, in the embodiments described above, defective pixels created after the production can also be corrected without needing any additional process.

Furthermore, in the embodiments described above, because a defective pixel is detected based on the evaluation along an edge direction and is corrected based on adjacent pixels located along the edge direction, the defective pixel detection/correction can be performed in a very reliable fashion without making an incorrect detection due to a high-frequency component such as a subject edge, and thus an excellent correction result can be achieved.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    a defective pixel detector for detecting a defective pixel included in an image sensor including a plurality of pixels;
    an edge direction detector for detecting, based on pixel values of pixels adjacent to the pixel of interest and the detection result by the defective pixel detector, a luminance gradient direction of the pixel of interest; and
    a corrector for correcting the pixel value of the pixel of interest based on the detection result by the edge direction detector,
    wherein the edge direction detector uses different calculations to detect the luminance gradient direction depending on whether the defective pixel detected by the defective pixel detector is included in the pixels adjacent to the pixel of interest.

2. The image processing apparatus according to claim 1, wherein the edge direction detector is for detecting the luminance gradient direction from the pixel value of the plurality of pixels located on both sides across the pixel of interest, and when the defective pixel detected by the defective pixel detector is included in either of the plurality of pixels, the edge direction detector detects the luminance gradient direction from the pixel value of the plurality of pixels by removing the pixel value of the defective pixel and the pixel value corresponding to the location of the defective pixel in the opposite direction to the defective pixel across the pixel of interest.

3. The image processing apparatus according to claim 1, wherein the corrector searches a plurality of corrected values by using the pixel values around the pixel of interest, and among the plurality of corrected values, the corrected value corresponding to the luminance gradient direction is selected and the selected corrected value is used for correcting the pixel value of the pixel of interest.

4. An image processing method for correcting a defective pixel value included in image data output from an image sensor including a plurality of pixels, the method comprising:
    detecting, by a defective pixel detector, a defective pixel included in the image sensor including the plurality of pixels;
    detecting, by an edge direction detector, based on pixel values of pixels adjacent to the pixel of interest and the detection result by the defective pixel detector, a luminance gradient direction of the pixel of interest; and
    correcting the pixel value of the pixel of interest based on the detection result by the edge direction detector,
    wherein the edge direction detector uses different calculations to detect the luminance gradient direction depending on whether the defective pixel detected by the defective pixel detector is included in the pixels adjacent to the pixel of interest.

* * * * *